(12) United States Patent
McGlade et al.

(10) Patent No.: US 11,790,410 B2
(45) Date of Patent: *Oct. 17, 2023

(54) SYSTEM AND METHOD FOR NATURAL CAPITAL MEASUREMENT

(71) Applicant: Downforce Technologies Limited, Oxford (GB)

(72) Inventors: Jacqueline Myriam McGlade, Warwickshire (GB); Kevin Peter Morris, Paignton (GB); Christopher Charles Lakey, Newcastle upon Tyne (GB)

(73) Assignee: DOWNFORCE TECHNOLOGIES LIMITED, Oxford (GB)

( * ) Notice: Subject to any disclaimer, the term of this patent is extended or adjusted under 35 U.S.C. 154(b) by 72 days.

This patent is subject to a terminal disclaimer.

(21) Appl. No.: 17/977,021

(22) Filed: Oct. 31, 2022

(65) Prior Publication Data

US 2023/0123300 A1    Apr. 20, 2023

Related U.S. Application Data

(63) Continuation-in-part of application No. 17/516,026, filed on Nov. 1, 2021.
(Continued)

(51) Int. Cl.
*G06Q 30/02* (2023.01)
*G06N 20/00* (2019.01)

(52) U.S. Cl.
CPC .............. *G06Q 30/0278* (2013.01); *G06N 20/00* (2019.01)

(58) Field of Classification Search
CPC ..... G06Q 30/018; G06F 30/12; G06K 9/6277; G06Q 50/26

USPC ........................................... 705/315
See application file for complete search history.

(56) References Cited

U.S. PATENT DOCUMENTS

| 2012/0143575 | A1 | 6/2012 | Imhof et al. |
| 2014/0278298 | A1* | 9/2014 | Maerten .............. G01V 99/005 703/2 |

(Continued)

FOREIGN PATENT DOCUMENTS

CN    110502725 A    11/2019

OTHER PUBLICATIONS

Chen "Artificial Intelligence techniques: An introduction to their use for modelling environmental systems." Mathematics and Computers in Simulation. 2008: 379-400. Vol. 78.
(Continued)

*Primary Examiner* — Sarah M Monfeldt
*Assistant Examiner* — Wenren Chen
(74) *Attorney, Agent, or Firm* — ROSSI, KIMMS & McDOWELL LLP

(57) ABSTRACT

Systems, methods, and storage mediums storing methods of natural capital measurement are described. A region of influence for the area whose natural capital is to be measured is determined and segmented into a plurality of segments. A land assessment model, including a system dynamics model and a spatially explicit model, is generated for the region of influence by training one or more machine learning algorithms to classify land use categories for the segments and to determine statistical relationships between state variables and properties of the segment. A flow sequence for simulating a transport of materials between the plurality of segments is executed to update the land assessment model. Health indicators for the natural capital of the area are generated using the updated land assessment model.

14 Claims, 28 Drawing Sheets

Related U.S. Application Data

(60) Provisional application No. 63/272,384, filed on Oct. 28, 2021, provisional application No. 63/226,292, filed on Jul. 28, 2021.

(56) References Cited

U.S. PATENT DOCUMENTS

2016/0247079 A1    8/2016    Mewes et al.

OTHER PUBLICATIONS

De. "Analysis of fuzzy applications in the agri-supply chain: A literature review" Journal of Cleaner Production. 2021. Vol. 283. 22 pages.
International Search Report issued in Intl. Appln. No. PCT/IB2022/056949 mailed Nov. 4, 2022.
Office Action issued in U.S. Appl. No. 17/516,026 mailed Feb. 18, 2022.
Office Action issued in U.S. Appl. No. 17/516,026 mailed Jul. 19, 2022.
Office Action issued in U.S. Appl. No. 17/516,026 mailed Sep. 21, 2022.
Pan, Haozhi, et al. "A dynamic and spatially explicit modeling approach to identify the ecosystem service implications of complex urban systems interactions." Ecological indicators 102 (2019): 426-436. (Year: 2019).*
Pandey. "Physically based soil erosion and sediment yield models revisited." Catena. 2016: 595-620. Vol. 147.
Randhir. "Multiple Criteria Dynamic Spatial Optimization to Manage Water Quality on a Watershed Scale." Transactions of the ASAE. 2000: 291-299. Vol. 43, No. 2.
Singh. "Hydrological studies for small watershed in India using the answers model." Journal of Hydrology. 2006: 184-199. Vol. 318.
Vanmaercke. "Measuring, modelling and managing gully erosion at large scales: A state of the art." Earth-Science Reviews. 2021. Vol. 218. 34 pages.
Written Opinion issued in Intl. Appln. No. PCT/IB2022/056949 mailed Nov. 4, 2022.

* cited by examiner

SYSTEM AND METHOD FOR NATURAL CAPITAL MEASUREMENT

CROSS REFERENCE TO RELATED APPLICATIONS

This application is a Continuation-in-Part, and claims the priority benefit, of U.S. Non Provisional Application No. 17/516,026 filed Nov. 1, 2021, which in turn claims the priority benefit of U.S. Provisional Application No. 63/226,292 filed Jul. 28, 2021, and U.S. Provisional Application No. 63/272,384 filed Oct. 27, 2021, the entire disclosures of each of which are hereby incorporated herein in their entirety by reference.

TECHNICAL FIELD OF THE INVENTION

Aspects of this disclosure generally are related to systems and methods of automatically analysing the dynamics of land and the health of natural capital, such as soil, water and biodiversity. More particularly, but not exclusively, the present invention relates to the integration and processing of external data sources using machine learning classifiers and deep learning, spatially explicit and system dynamics modelling of health indicators, and the statistical classification of the modelled health indicators to measure the health of natural capital.

BACKGROUND OF THE INVENTION

Contemporary issues in soil health and natural capital measurement span a wide spectrum of challenges and scales — from global climate change to resiliency in national and regional food systems to the sustainability of livelihoods of small-holder farmers — all of which may be characterized as complex problems. Complex problems differ from simple or complicated problems in that they exhibit several key system properties: (a) components are tightly coupled and organized ("everything influences almost everything else"); (b) observed behaviors are dynamic ("change occurs at many time scales"); (c) interventions are most often policy resistant ("obvious solutions fail or make things worse"); (d) causal relationships are counterintuitive ("causes and effects are distant in time and space"); and (e) tradeoffs in preferred system pathways are presented ("long-term and short-term solutions are often at odds"). In the real-world, resources and systems often overlap and interact through complex feedback processes, which involve numerous variables, can operate at multiple temporal and spatial scales, and involve human decision making that can exacerbate perturbations or create new and unintended problems.

Land use is a leading cause of climate change. Healthy soils and ecosystems are the most effective way to trap carbon from the atmosphere and reduce the effects of global warming. Through agriculture practices alone, up to 133bn tonnes of carbon may have been lost from the top 2-metres of world's soil. With 50% of habitable land globally being used for agriculture (either crop or livestock), it is also one of the greatest pressures to biodiversity by threatening 86% of the species on the IUCN Red List.

However, land use is also the only scalable carbon sequestration solution available today. Through effective land management and agriculture practices, we could improve natural capital assets, including soil health, and offset over 20% of annual global greenhouse gas emissions globally while improving the overall health of the ecosystem. To utilize land to its full potential in solving our global environmental problems, efficient measurement tools need to exist that allow for easy tracking of progress.

So far, measuring soil carbon and overall soil health has been a very limited, time-consuming, expensive, and inaccurate process. Conventional methods of measuring soil health rely on manual measurement of individual soil samples, laboratory testing, and a focus on individual soil indicators. However, fully understanding soil health requires measuring numerous health indicators, including but not limited to, erosion potential, water holding capacity, salinity, pH, nitrogen, phosphorus, cation exchange, water quality, water quantity, microbial turn-over, gas exchange, total carbon, and sequestered carbon potential. It is impossible, not just impractical, for land-owners and land-stewards to fully assess all the indicators for soil health using soil samples and implement holistic and complex land management practices that improve their land's health and potential for carbon sequestration. Moreover, these conventional techniques require a large amount of soil samples to be collected from different parts of a land area or site every time the soil health needs to be measured.

The process of soil sampling brings significant expenses and inaccuracies which stem from assembling and dispatching the equipment, personnel time and expertise required, collecting representative samples, soil handling, and laboratory analysis. Inaccuracies may also arise from heterogeneity in soil condition over a field and the use of different sampling and analytical techniques.

As a result, in recent years, various techniques for measuring soil health have focused on reducing the costs while maintaining accuracy. These include:

1) Remote sensing techniques. Remote sensing techniques leverage satellite data and machine learning algorithms to measure crop and bare soil indicators. However, standard remote sensing techniques provide a very restricted number of relevant indicators and fail to provide a holistic picture of the soil health. This is mainly due to the complexity of soil and the fact that satellite data on their own have very limited ability to detect subsurface changes in soil.

2) Combination of remote sensing approach with soil samples. Soil samples can improve the accuracy of remote sensing models through machine learning techniques. However, extensive ground sampling is still required before the remote sensing models alone can be accurately calibrated and validated to forecast soil health accurately. Moreover, this approach does not scale well to remote regions and is extremely expensive. Imagine trying to map the carbon sequestration ability of the Grand Canyon, the Australian Outback, or the Kalahari Desert. Getting enough soil samples for these areas to support an accurate determination of soil health may not just be impractical, but impossible.

3) System dynamics models. System dynamics models permit the designer to draw upon both qualitative (mental models) and quantitative (measurement and simulation) techniques to improve soil health estimation and prediction. Current system dynamics models rely on soil samples and other forms of historical data to generate initial conditions, and provide the basis for calibration and validation. This means that the existing system dynamics models require significant user input before the model can be run. The current system dynamics models have only been able to model land health indicators at a very generic level due to constraints of calibrating, validating, and running the models. It has also meant that these models have a narrow focus on a limited number of indicators and cannot accurately and reliably predict future soil health at high resolution.

While some of these methods may address individual components of the multifaceted, complex problems in natural capital management, they oftentimes neglect unintended consequences to other systems. Because natural capital management systems are complex and difficult to comprehend, these efforts to address the challenges in measuring soil health have used traditional methods that are familiar and easy to accept, and that were promoted within disciplinary silos. Many of these methods assume simple cause-and-effect relationships between system components and focus on progressively narrower model boundaries of investigative efforts to isolate components. Such isolation exposes any analysis of the soil health to the risk of not adequately recognizing or diagnosing root causes of issues or not incorporating all of the pertinent factors at work, which could lead to flawed or unsustainable recommendations regarding strategy or policy implementation as well as perpetuating the symptoms of the original problem or making the problem even worse.

Accordingly, there is a need to develop technical solutions that fuse spatiotemporal data from multiple sources with geospatial and dynamic systems models to analyse the dynamics of land and the health of natural capital, such as soil, water and biodiversity and derive predictions and measures of the health of land and natural capital. There is also a need to improve the accuracy of land and soil health indicators by using large collections of data modeled with machine learning technology.

SUMMARY OF THE INVENTION

At least the above-discussed needs are addressed and technical solutions are achieved in the art by various embodiments of the present invention. With new satellite data becoming available, and computing power being able to deal with big data, it is possible to integrate remote sensing techniques with machine learning algorithms and system dynamics and catchment models, going far beyond what is possible with conventional manual or simple computational processes. This produces a unique system that allows for an inexpensive, accurate, and quick means of determining a holistic perspective of the natural capital and health of land, including carbon and overall soil health.

While the health of soil is the cornerstone to any healthy, functioning terrestrial ecosystem, using a land assessment model, made up of a system dynamics model and water catchment model, also allows features such as water, sediment and biodiversity indicators to be tracked. Furthermore, with an appropriate data integration approach, a land assessment model is capable of providing accounts for natural capital.

According to a first embodiment of the invention there is provided a processor executable method of measuring natural capital. The method comprises determining an area whose natural capital is to be assessed using one or more health indicators; determining a region of influence for the area; training a fuzzy classifier on historical statistical distributions between a plurality of state variables and one or more properties of the region of influence to generate statistical relationships between the plurality of state variables and the one or more properties of the region of influence; generating a system dynamics model defining interactions between the one or more properties of the region of influence based on the generated statistical relationships obtained from the trained fuzzy classifier; segmenting the region of influence into a plurality of segments; training a land use classifier to classify the area into one or more land use categories; generating a spatially explicit model, which defines transport of material between the plurality of segments, based on elevation data obtained from one or more databases and land use data indicating a land use category associated with each segment of the plurality of segments and obtained from the trained land use classifier; determining a flow sequence, for simulating transport of one or more materials from one or more segments of the plurality of segments to adjacent segments based at least on the generated system dynamics model and the generated spatially explicit model, by assigning a stream order number to each respective segment of the plurality of segments based on a number of inflows to the respective segment from other segments of the plurality of segments and a number of outflows from the respective segment to other segments; simulating the flow sequence; and generating the one or more health indicators for the natural capital of the area using the recursively updated spatially explicit model. The flow sequence is simulated by recursively processing the plurality of segments, based on each respective segment's stream order number, to update the one or more properties of the respective segment based on transport of the one or more materials from inflows to the respective segment and to outflows from the respective segment for a predetermined number of iterations, each iteration representing a time unit; and updating the generated system dynamics model and the generated spatially explicit model after each iteration.

In some embodiments, the method further includes storing the generated one or more health indicators in a non-transitory storage device.

In some embodiments, the method further includes determining current or historical spatial distributions or statistics of the one or more health indicators for the area; and generating the system dynamics model based at least on the determined current or historical spatial distributions or statistics.

In some embodiments, the determined current or historical spatial distributions or statistics are generated by querying pre-defined statistical relationships between the plurality of state variables and one or more soil organic carbon properties using measured one or more properties for the region of influence; and generating information on the one or more soil organic carbon properties for the region of influence based at least on the queried generated statistical relationships.

In some embodiments, the method further includes simulating the effects of climate change or land management options on the one or more health indicators for the natural capital of the area.

In some embodiments, the method further includes receiving, via a user interface, a user-drawn polygon representing the area.

In some embodiments, the method further includes receiving, via a user interface, a parcel or land identifier associated with the area; and generating, using the received parcel or land identifier and a property boundary database, a polygon representing the area.

In some embodiments, the method further includes classifying the area into one or more land portions and one or more water portions; and excluding the classified one or more water portions from the region of influence.

In some embodiments, segments of the plurality of segments are defined by uniform geometric shapes or non-uniforms areas of homogenous properties.

In some embodiments, the plurality of parameters includes one or more of rainfall, temperature, land cover, biome, soil type, leaf area index, dry matter productivity and normalised difference vegetation index, short wave infrared, fractional cover, or soil moisture.

In some embodiments, the one or more properties of the region of influence include soil organic carbon concentration, nitrogen concentration, phosphorus concentration, coarse fraction, and bulk density.

In some embodiments, the one or more materials include at least one of water, nutrient, or sediment.

In some embodiments, the one or more health indicators include at least one of water holding capacity, erosion potential, flood control, nutrient concentration, water quality, water quantity, biodiversity, total carbon, or sequestered carbon.

According to a second embodiment of the invention there is provided a natural capital measurement system comprising a memory configured to store instructions; and a processor communicatively connected to the memory and configured to execute the stored instructions. The stored instructions are executed to perform the method discussed above with respect to the first embodiment.

According to a third embodiment, a non-transitory computer-readable storage medium configured to store a program that performs a method of measuring natural capital, according to the first embodiment, is provided.

According to some embodiments, a computer program product includes program code portions for performing the steps of any or all of each of methods described herein, when the computer program product is executed by a computing device. Each of any or all of such computer program products may be stored on one or more computer readable storage mediums.

Various embodiments of the present invention may include systems, devices, or machines that are or include combinations or subsets of any or all of the systems, devices, or machines and associated features thereof described herein.

Further, all or part of any or all of the systems, devices, or machines discussed herein or combinations or subcombinations thereof may implement or execute all or part of any or all of the methods and processes discussed herein or combinations or subcombinations thereof.

Any of the features of all or part of any or all of the methods and processes discussed herein may be combined with any of the other features of all or part of any or all of the methods and processes discussed herein. In addition, a computer program product may be provided that comprises program code portions for performing some or all of any or all of the methods and processes and associated features thereof described herein, when the computer program product is executed by a computer or other computing device or device system. Such a computer program product may be stored on one or more computer-readable storage mediums, also referred to as one or more computer-readable data storage mediums.

In some embodiments, each of any or all of the computer-readable data storage medium systems (also referred to as processor-accessible memory device systems) described herein is a non-transitory computer-readable (or processor-accessible) data storage medium system (or memory device system) including or consisting of one or more non-transitory computer-readable (or processor-accessible) storage mediums (or memory devices) storing the respective program(s) which may configure a data processing device system to execute some or all of one or more of the methods and processes described herein.

Further, any or all of the methods and associated features thereof discussed herein may be implemented or executed by all or part of a device system, apparatus, or machine, such as all or a part of any of the systems, apparatuses, or machines described herein or a combination or subcombination thereof.

BRIEF DESCRIPTION OF THE DRAWINGS

It is to be understood that the attached drawings are for purposes of illustrating aspects of various embodiments and may include elements that are not to scale. It is noted that like reference characters in different figures refer to the same objects.

DETAILED DESCRIPTION OF THE INVENTION

Figure 1:
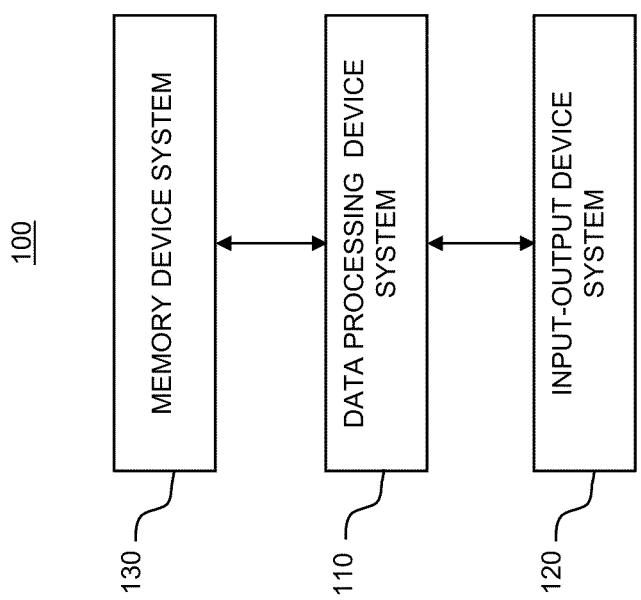
FIG. 1 shows an example of a computing device system, in accordance with an embodiment of the invention.

The present invention provides various systems and methods for measuring natural capital using data, system dynamics models, and machine learning. It should be noted that the invention is not limited to these or any other examples provided herein, which are referred to for purposes of illustration only.

In this regard, in the descriptions herein, certain specific details are set forth in order to provide a thorough understanding of various embodiments of the invention. However, one skilled in the art will understand that the invention may be practiced at a more general level without one or more of these details. In other instances, well-known structures have not been shown or described in detail to avoid unnecessarily obscuring descriptions of various embodiments of the invention.

Any reference throughout this specification to "one embodiment", "an embodiment", "an example embodiment", "an illustrated embodiment", "a particular embodiment", "some embodiments" and the like means that a particular feature, structure or characteristic described in connection with the embodiment is included in at least one embodiment. Thus, any appearance of the phrase "in one embodiment", "in an embodiment", "in an example embodiment", "in this illustrated embodiment", "in this particular embodiment", "some embodiments" or the like in this specification is not necessarily all referring to one embodiment or a same embodiment. Furthermore, the particular features, structures or characteristics of different embodiments may be combined in any suitable manner to form one or more other embodiments.

Unless otherwise explicitly noted or required by context, the word "or" is used in this disclosure in a non-exclusive sense. In addition, unless otherwise explicitly noted or required by context, the word "set" is intended to mean one or more. For example, the phrase, "a set of objects" means one or more of the objects.

In the following description, some embodiments of the present invention may be implemented at least in part by a data processing device system configured by a software program. Such a program may equivalently be implemented as multiple programs, and some or all of such software program(s) may be equivalently constructed in hardware. Further, the phrase "at least" is or may be used herein at times merely to emphasize the possibility that other elements may exist beside those explicitly listed. However, unless otherwise explicitly noted (such as by the use of the term "only") or required by context, non-usage herein of the phrase "at least" nonetheless includes the possibility that other elements may exist besides those explicitly listed. For example, the phrase, 'based at least on A' includes A as well as the possibility of one or more other additional elements besides A. In the same manner, the phrase, 'based on A' includes A, as well as the possibility of one or more other additional elements besides A. However, the phrase, 'based only on A' includes only A. Similarly, the phrase 'configured at least to A' includes a configuration to perform A, as well as the possibility of one or more other additional actions besides A. In the same manner, the phrase 'configured to A' includes a configuration to perform A, as well as the possibility of one or more other additional actions besides A. However, the phrase, 'configured only to A' means a configuration to perform only A.

The word "device", the word "machine", the word "system", and the phrase "device system" all are intended to include one or more physical devices or sub-devices (e.g., pieces of equipment) that interact to perform one or more functions, regardless of whether such devices or sub-devices are located within a same housing or different housings. However, it may be explicitly specified according to various embodiments that a device or machine or device system resides entirely within a same housing to exclude embodiments where the respective device, machine, system, or device system resides across different housings. The word "device" may equivalently be referred to as a "device system" in some embodiments.

The term "program" in this disclosure should be interpreted to include one or more programs including a set of instructions or modules that may be executed by one or more components in a system, such as a controller system or data processing device system, in order to cause the system to perform one or more operations. The set of instructions or modules may be stored by any kind of memory device, such as those described subsequently with respect to the memory device system 130, 251, or both, shown in FIGS. 1 and 2, respectively. In addition, this disclosure may describe or similarly describe that the instructions or modules of a program are configured to cause the performance of an action. The phrase "configured to" in this context is intended to include at least (a) instructions or modules that are presently in a form executable by one or more data processing devices to cause performance of the action (e.g., in the case where the instructions or modules are in a compiled and unencrypted form ready for execution), and (b) instructions or modules that are presently in a form not executable by the one or more data processing devices, but could be translated into the form executable by the one or more data processing devices to cause performance of the action (e.g., in the case where the instructions or modules are encrypted in a non-executable manner, but through performance of a decryption process, would be translated into a form ready for execution). Such descriptions should be deemed to be equivalent to describing that the instructions or modules are configured to cause the performance of the action. The word "module" may be defined as a set of instructions. The word "program" and the word "module" may each be interpreted to include multiple subprograms or multiple submodules, respectively. In this regard, reference to a program or a module may be considered to refer to multiple programs or multiple modules.

Further, it is understood that information or data may be operated upon, manipulated, or converted into different forms as it moves through various devices or workflows. In this regard, unless otherwise explicitly noted or required by context, it is intended that any reference herein to information or data includes modifications to that information or data. For example, "data X" may be encrypted for transmission, and a reference to "data X" is intended to include both its encrypted and unencrypted forms, unless otherwise required or indicated by context. Further, the phrase "graphical representation" used herein is intended to include a visual representation presented via a display device system and may include computer-generated text, graphics, animations, or one or more combinations thereof, which may include one or more visual representations originally generated, at least in part, by an image-capture device.

Further still, example methods are described herein with respect to FIGS. 3, 13, 14, 18, and 28. Such figures are described to include blocks associated with computer-executable instructions. It should be noted that the respective instructions associated with any such blocks herein need not be separate instructions and may be combined with other instructions to form a combined instruction set. The same set of instructions may be associated with more than one block. In this regard, the block arrangement shown in method FIGS. 3, 13, 14, 18, and 28 herein is not limited to an actual structure of any program or set of instructions or required ordering of method tasks, and such method FIGS. 3, 13, 14, 18, and 28, according to some embodiments, merely illustrate the tasks that instructions are configured to perform, for example upon execution by a data processing device system in conjunction with interactions with one or more other devices or device systems.

Figure 2:
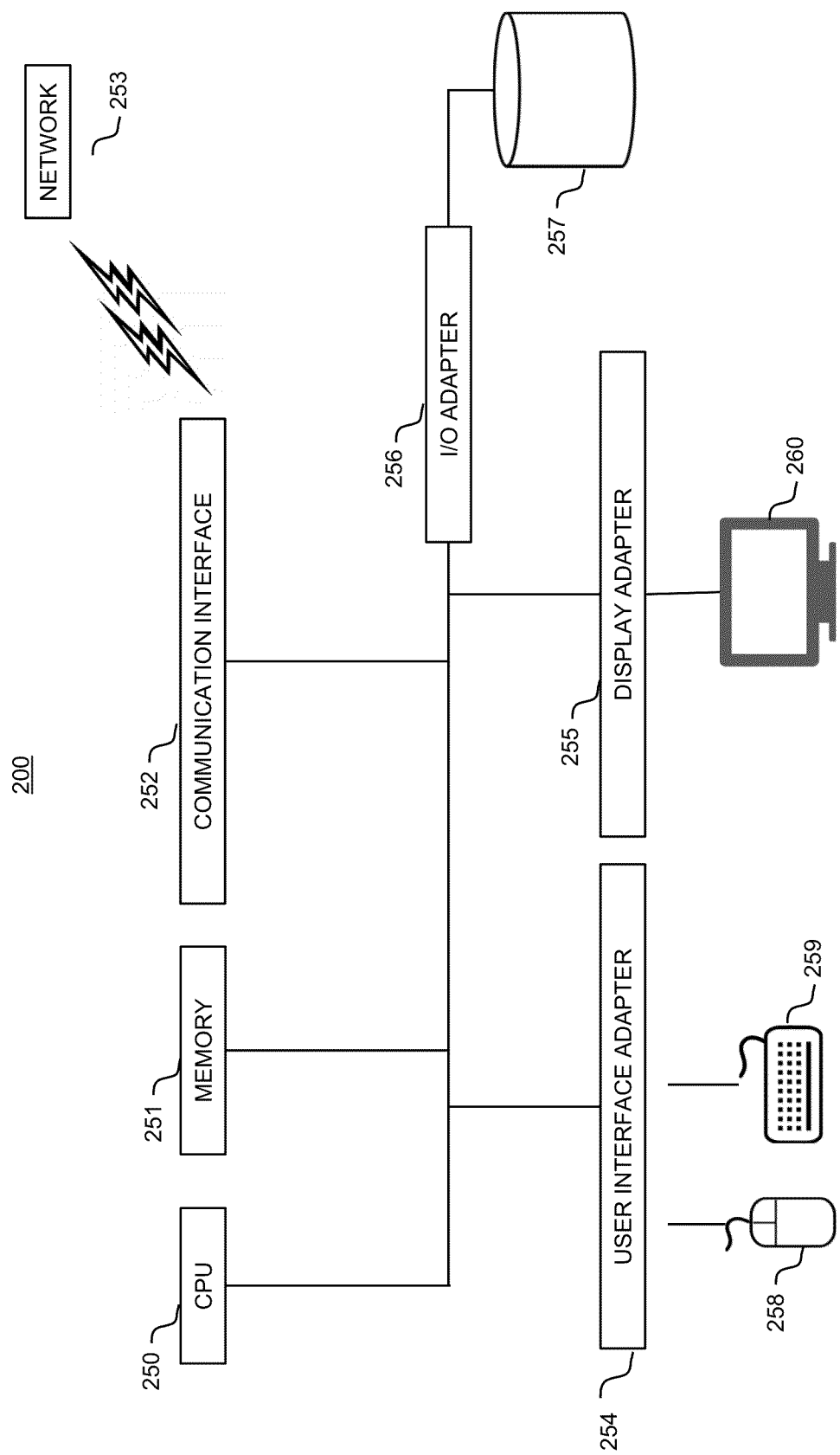
FIG. 2 shows another an example of a computing device system, in accordance with an embodiment of the invention.

FIG. 1 schematically illustrates a system 100 according to some embodiments. In some embodiments, the system 100 may be a computing device 200 (as shown in FIG. 2). In some embodiments, the system 100 includes a data processing device system 110, an input-output device system 120, and a processor-accessible memory device system 130. The processor-accessible memory device system 130 and the input-output device system 120 are communicatively connected to the data processing device system 110.

The data processing device system 110 includes one or more data processing devices that implement or execute, in conjunction with other devices, such as one or more of those in the system 100, control programs associated with some of the various embodiments. Each of the phrases "data processing device", "data processor", "processor", and "computer" is intended to include any data processing device, such as a central processing unit ("CPU"), a desktop computer, a laptop computer, a mainframe computer, a tablet computer, a personal digital assistant, a cellular phone, and any other device configured to process data, manage data, or handle data, whether implemented with electrical, magnetic, optical, biological components, or other.

The memory device system 130 includes one or more processor-accessible memory devices configured to store information, including the information needed to execute the control programs associated with some of the various embodiments. The memory device system 130 may be a distributed processor-accessible memory device system including multiple processor-accessible memory devices communicatively connected to the data processing device system 110 via a plurality of computers and/or devices. On the other hand, the memory device system 130 need not be a distributed processor-accessible memory system and, consequently, may include one or more processor-accessible memory devices located within a single data processing device.

Each of the phrases "processor-accessible memory" and "processor-accessible memory device" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs (Read-Only Memory), and RAMs (Random Access Memory). In some embodiments, each of the phrases "processor-accessible memory" and "processor-accessible memory device" is intended to include a non-transitory computer-readable storage medium. In some embodiments, the memory device system 130 can be considered a non-transitory computer-readable storage medium system.

The phrase "communicatively connected" is intended to include any type of connection, whether wired or wireless, between devices, data processors, or programs in which data may be communicated. Further, the phrase "communicatively connected" is intended to include a connection between devices or programs within a single data processor, a connection between devices or programs located in different data processors, and a connection between devices not located in data processors at all. In this regard, although the memory device system 130 is shown separately from the data processing device system 110 and the input-output device system 120, one skilled in the art will appreciate that the memory device system 130 may be located completely or partially within the data processing device system 110 or the input-output device system 120. Further in this regard, although the input-output device system 120 is shown separately from the data processing device system 110 and the memory device system 130, one skilled in the art will appreciate that such system may be located completely or partially within the data processing system 110 or the memory device system 130, depending upon the contents of the input-output device system 120. Further still, the data processing device system 110, the input-output device system 120, and the memory device system 130 may be located entirely within the same device or housing or may be separately located, but communicatively connected, among different devices or housings. In the case where the data processing device system 110, the input-output device system 120, and the memory device system 130 are located within the same device, the system 100 of FIG. 1 can be implemented by a single application-specific integrated circuit (ASIC) in some embodiments.

The input-output device system 120 may include a mouse, a keyboard, a touch screen, another computer, or any device or combination of devices from which a desired selection, desired information, instructions, or any other data is input to the data processing device system 110. The input-output device system 120 may include any suitable interface for receiving information, instructions or any data from other devices and systems described in various ones of the embodiments.

The input-output device system 120 also may include an image generating device system, a display device system, a speaker device system, a processor-accessible memory device system, or any device or combination of devices to which information, instructions, or any other data is output from the data processing device system 110. In this regard, if the input-output device system 120 includes a processor-accessible memory device, such memory device may or may not form part or all of the memory device system 130. The input-output device system 120 may include any suitable interface for outputting information, instructions or data to other devices and systems described in various ones of the embodiments. In this regard, the input-output device system may include various other devices or systems described in various embodiments.

FIG. 2 shows an example of a computing device system 200, according to some embodiments. The computing device system 200 may include a processor 250, corresponding to the data processing device system 110 of FIG. 1, in some embodiments. The memory 251, input/output (I/O) adapter 256, and non-transitory storage medium 257 may correspond to the memory device system 130 of FIG. 1, according to some embodiments. The user interface adapter 254, mouse 258, keyboard 259, display adapter 255, and display 260 may correspond to the input-output device system 120 of FIG. 1, according to some embodiments. The computing device 200 may also include a communication interface 252 that connects to a network 253 for communicating with other computing devices 200.

Various methods 300, 1300, 1400, 1800, and 2800 may be performed by way of associated computer-executable instructions according to some example embodiments. In various example embodiments, a memory device system (e.g., memory device system 130) is communicatively connected to a data processing device system (e.g., data processing device systems 110, otherwise stated herein as "e.g., 110") and stores a program executable by the data processing device system to cause the data processing device system to execute various embodiments of methods 300, 1300, 1400, 1800, and 2800. In these various embodiments, the program may include instructions configured to perform, or cause to be performed, various ones of the instructions associated with execution of various embodiments of methods 300, 1300, 1400, 1800, and 2800. In some embodiments, methods 300, 1300, 1400, 1800, and 2800 may include a subset of the associated blocks or additional blocks than those shown in FIGS. 3, 13, 14, 18, and 28. In some embodiments, methods 300, 1300, 1400, 1800, and 2800 may include a different sequence indicated between various ones of the associated blocks shown in FIGS. 3, 13, 14, 18, and 28.

Figure 3:
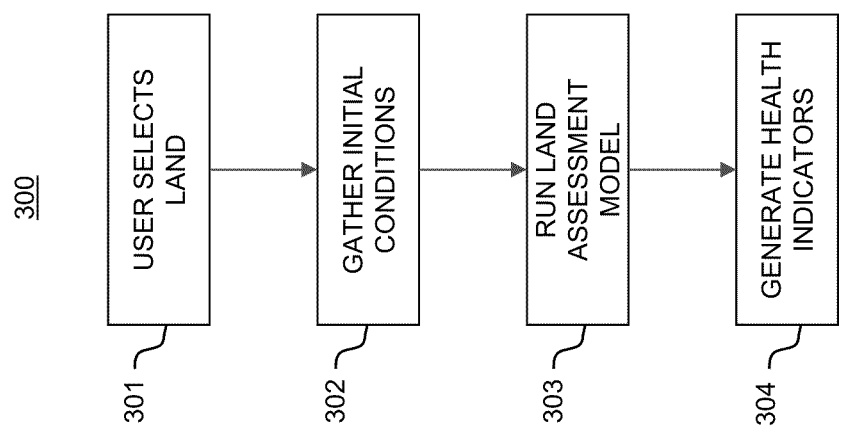
FIG. 3 shows a flow diagram of a method of outputting health indicators from user inputs, in accordance with an embodiment of the invention.

FIG. 3 shows a flow diagram of an example method 300 of generating health indicators from a user land selection, according to some embodiments of the invention. In some embodiments of the invention, the user selects a piece of land to be analysed in step 301. In step 302, a land intelligence system gathers initial conditions to build a land assessment model. In step 303, the land assessment model is run. In some embodiments of the invention, after the land assessment model has been processed in both time and space, health indicators for the selected land are generated and output in step 304.

Figure 4:
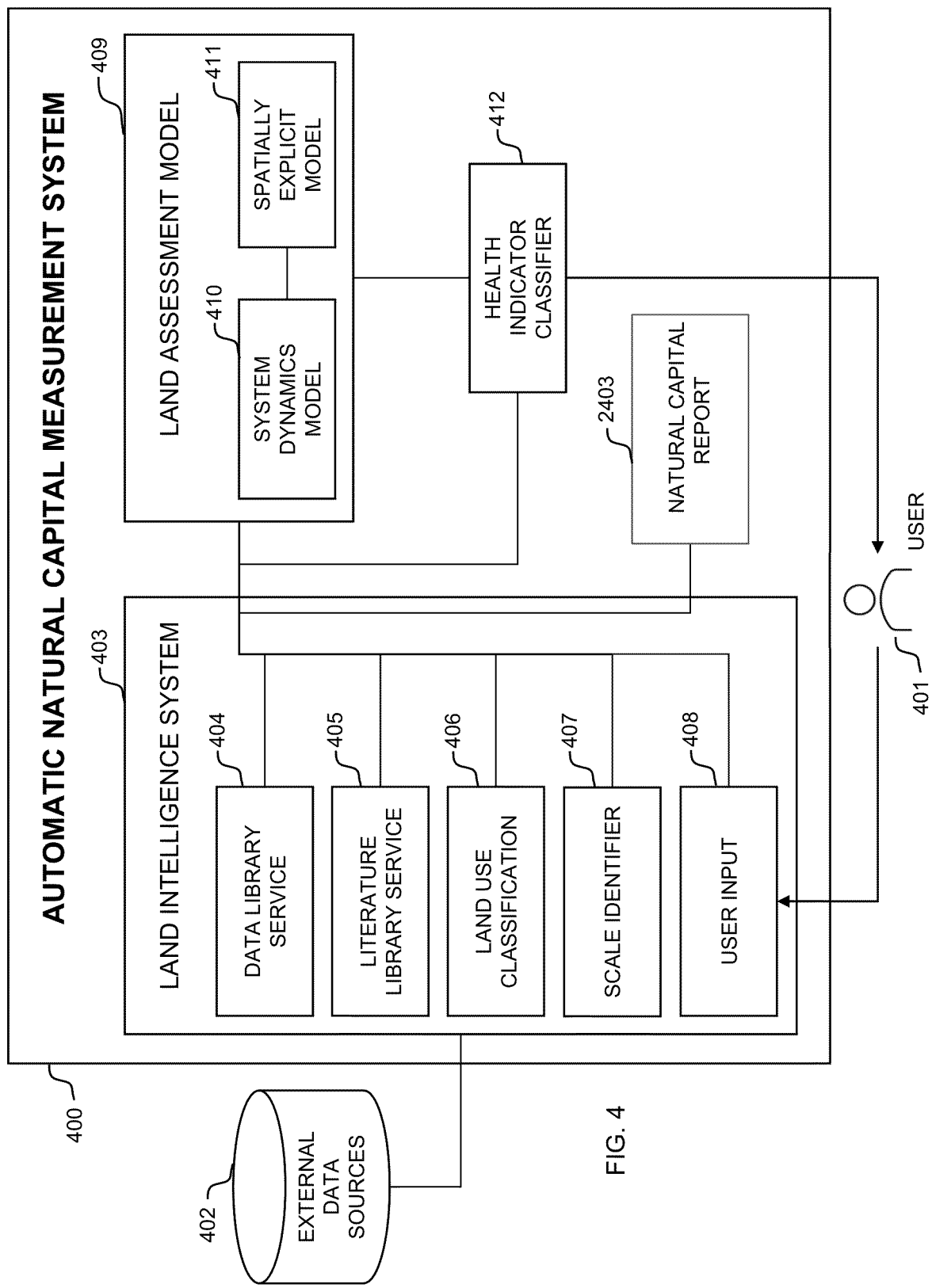
FIG. 4 shows a block diagram illustrating an automatic natural capital measurement system, in accordance with an embodiment of the invention.

FIG. 4 shows an example of an automatic natural capital measurement system 400, in accordance with an embodiment of the invention. In the specification, the phrase automatic natural capital measurement system encompasses any automatic natural capital system having the features described herein. In some embodiments of the invention, a user 401 interacts with the automatic natural capital measurement system 400. In some embodiments of the invention, the automatic natural capital measurement system 400 includes external data sources 402, a land intelligence system 403, a land assessment model 409, and health indicator classifier module 412. The land intelligence system 403 may include various modules such as a data library service 404, a literature library service 405, a land use classification 406, a scale identifier 407, and a user input module 408. The land intelligence system 403 is powered by training machine learning classifiers on direct measurements, proximally sensed measurements and geospatial datasets, to generate prediction models. The land assessment model may include a system dynamics model 410 and a spatially explicit model 411. In some embodiments of the invention, the spatially explicit model 411 may be a hydrology model.

In some embodiments, the user input module 408 may be configured to, via the stored program, receive a request from the user 401 of either type parcel or land ID 601 or type polygon 603. In some embodiments, the user input module 408 may be further configured to automatically convert the data coming from the user 401 to a geo-polygon (polygon) 603 if a parcel or land ID 601 is given.. In some embodiments, the automatic natural capital measurement system 400 may be further configured so that the scale identifier module 407, land use classification module 406, literature library service module 405, data library service module 404, and the land assessment model 409 use the geo-polygon 603 defined by the user. In some embodiments, the automatic natural capital measurement system 400 may be further configured so that the data library service module 404, literature library service module 405, land use classification module 406 and the scale identifier module 407 use land data from external data sources 402. In some embodiments, the automatic natural capital measurement system 400 may be further configured so that the components of the land intelligence system 403 provide health indicator statistics such as soil organic carbon relationship 1500, soil organic carbon reports 2500, 2600, and reports of natural capital assets 2403. In some embodiments, the automatic natural capital measurement system 400 may be further configured to provide the initial conditions for the land assessment model 409. In some embodiments, the automatic natural capital measurement system 400 may be further configured to contextualise outputs of the land assessment model 409 in the health indicator classifier module 412 using processed statistical data from one or more of the data library service module 404, literature library service module 405, land use classification module 406 and the scale identifier module 407. In some embodiments, the automatic natural capital measurement system 400 may be further configured to, via the stored program, return outputs from the health indicator classifier module 412 to the user. Details of the various components of the automatic natural capital measurement system 400 are discussed below.

Figure 5:
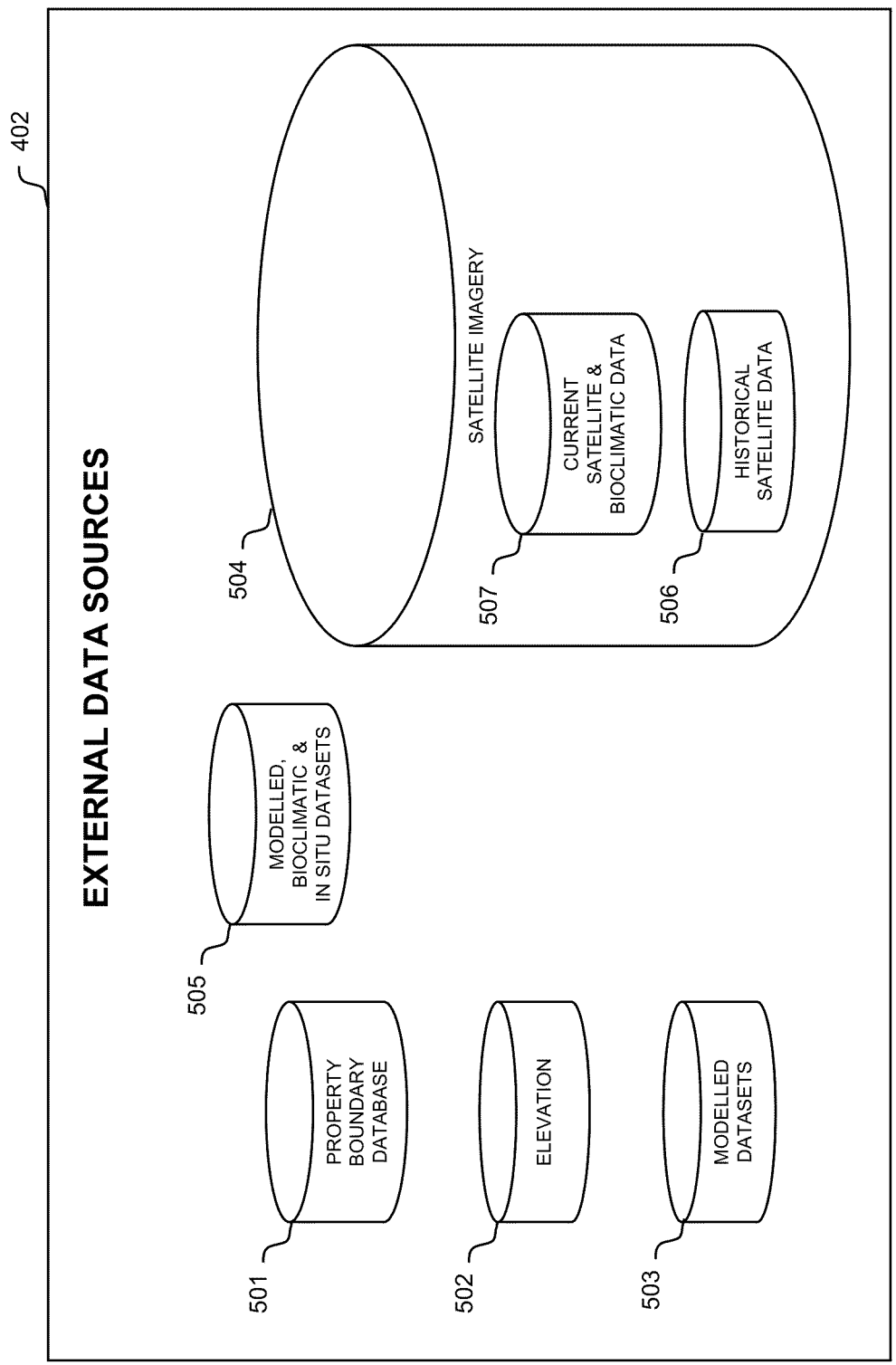
FIG. 5 shows a block diagram illustrating external data sources for the automatic natural capital measurement system, in accordance with an embodiment of the invention.

FIG. 5 shows examples of various external data sources 402 that may be used for the automatic natural capital measurement system 400, according to some embodiments of the invention. The property boundary database 501 includes information associating parcel or land IDs 601 with geopolygons 603 defining the boundaries of areas of land corresponding to the parcel or land IDs 601. The elevation data 502 includes elevation data for various areas of land. The modelled datasets 503, that are used to train the machine learning models, include but are not limited to gridded meteorological data, biome data, data on soil characteristics, or elevation data. Satellite imagery 504, also used to train the machine learning models, includes but is not limited to various satellite data such as Sentinel 2 Normalised Difference Vegetation Index, Sentinel 2 Short Wave Infrared, Sentinel 3 Leaf Area Index, Sentinel 3 Dry Matter Productivity, Sentinel 3 Fractional Cover, and MODIS Fractional Cover. The satellite imagery 504 may also include historical multispectral data 506 and current satellite & bioclimatic data 507. Modelled & in situ datasets 505 may include, in addition to the data provided in the modelled datasets 503, sampled in situ datasets which include but are not limited to national soil survey samples and data from individual farms.

Figure 6:
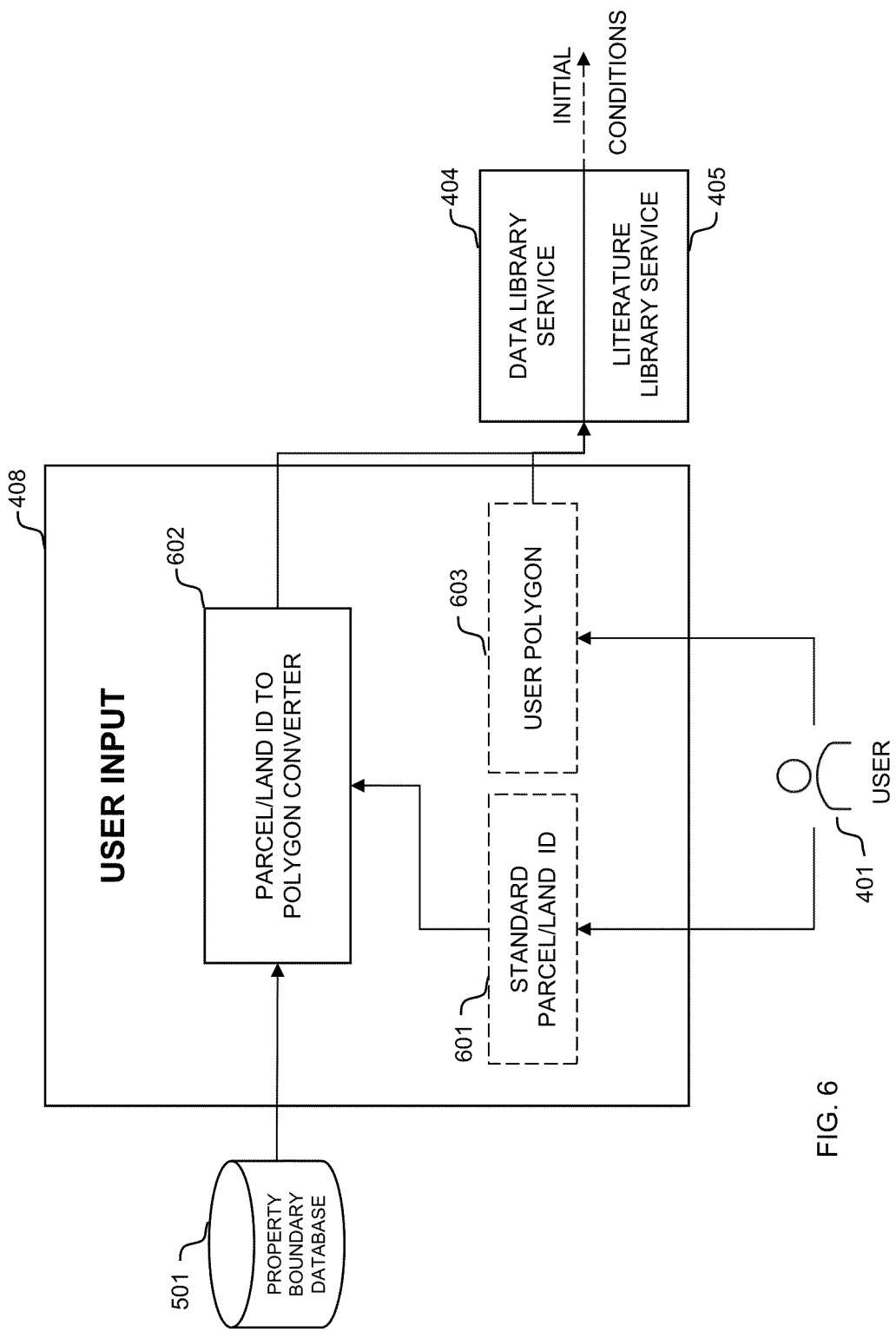
FIG. 6 shows a block diagram illustrating a user input module as a component of a land intelligence system included in the automatic natural capital measurement system, in accordance with an embodiment of the invention.
Figure 10:
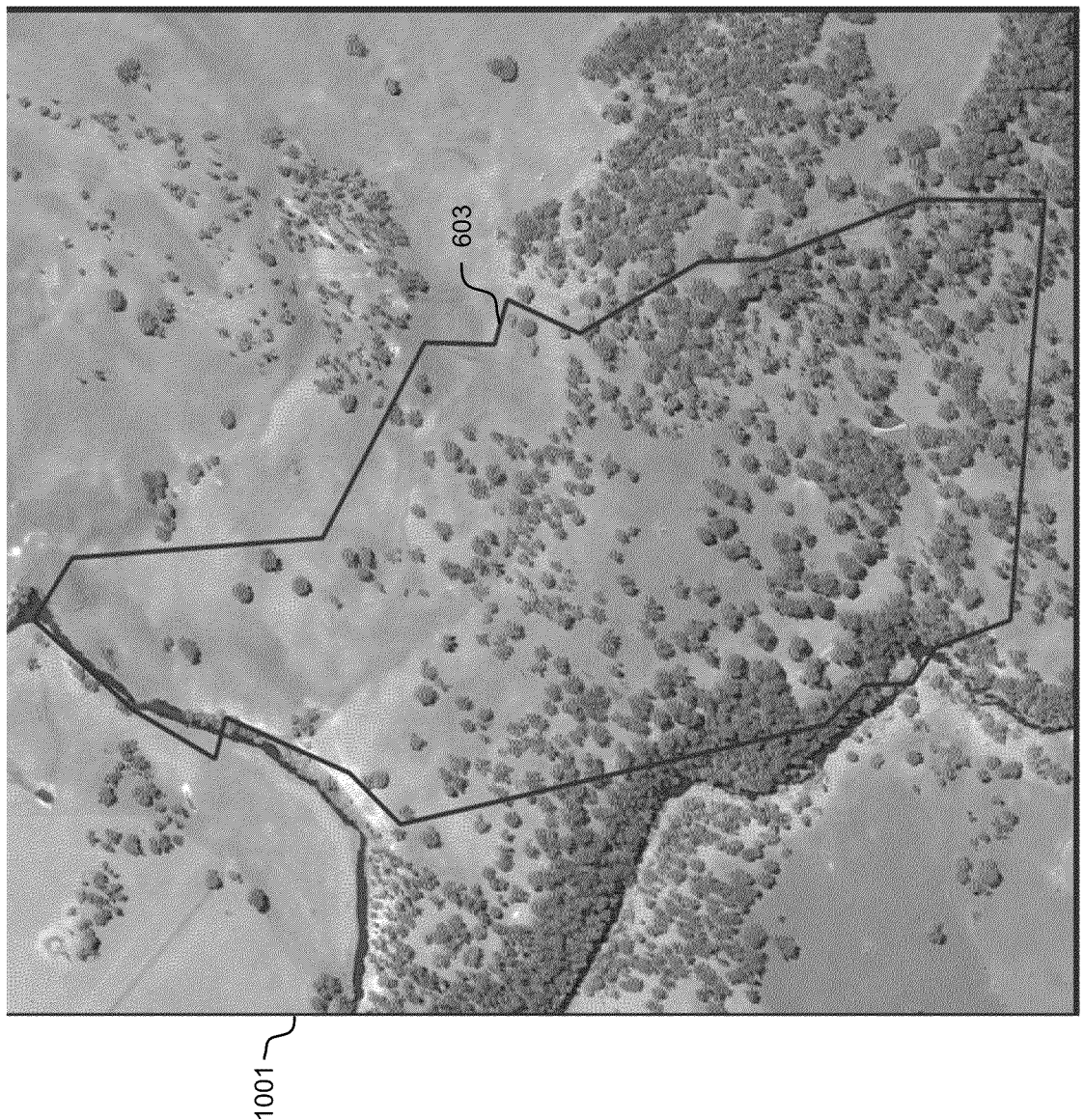
FIG. 10 shows an example of satellite data with user input, in accordance with an embodiment of the invention.

FIG. 6 shows a block diagram for the user input module 408 in more detail, according to some embodiments of the invention. In some embodiments of the invention, the user input module 408 of the land intelligence system 403 receives user input from a user 401. The user input may include a standard parcel or land ID 601 or a user defined polygon 603. In some embodiments of the invention, the user defined polygon is superimposed or overlaid on a satellite image 1001. FIG. 10 shows an example of a satellite image 1001, on which the user 401 has defined a polygon 603, denoting the boundaries of a geographical area whose health indicators are to be measured. The user input is not limited to polygons overlaid on a satellite image but may be provided in other forms such as a set of geospatial coordinates defining vertices of a polygon, a set of vectors or line/curves defining edges of polygon, or polygons overlaid on non-satellite images.

In some embodiments, the user input may be provided in the form of a parcel or land ID 601 or another identifier associated with a geographical area. In this case, the user input module 408 takes the parcel or land ID 601 and a property boundary database 501 as inputs and outputs a polygon 603 corresponding to the boundaries of the parcel or land ID 601 using a conversion operation 602. In some embodiments, in the conversion operation 602, the standard parcel or land ID 601 is queried against a property boundary database 501 to determine the edges of a polygon representing the area of land associated with the parcel or land ID 601. In some embodiments, the conversion operation 602 produces the user polygon 603, irrespective of the form of the user input, which is then subsequently used in the data library service module 404, the literature library service module 405, and the scale identifier module 407.

Figure 7:
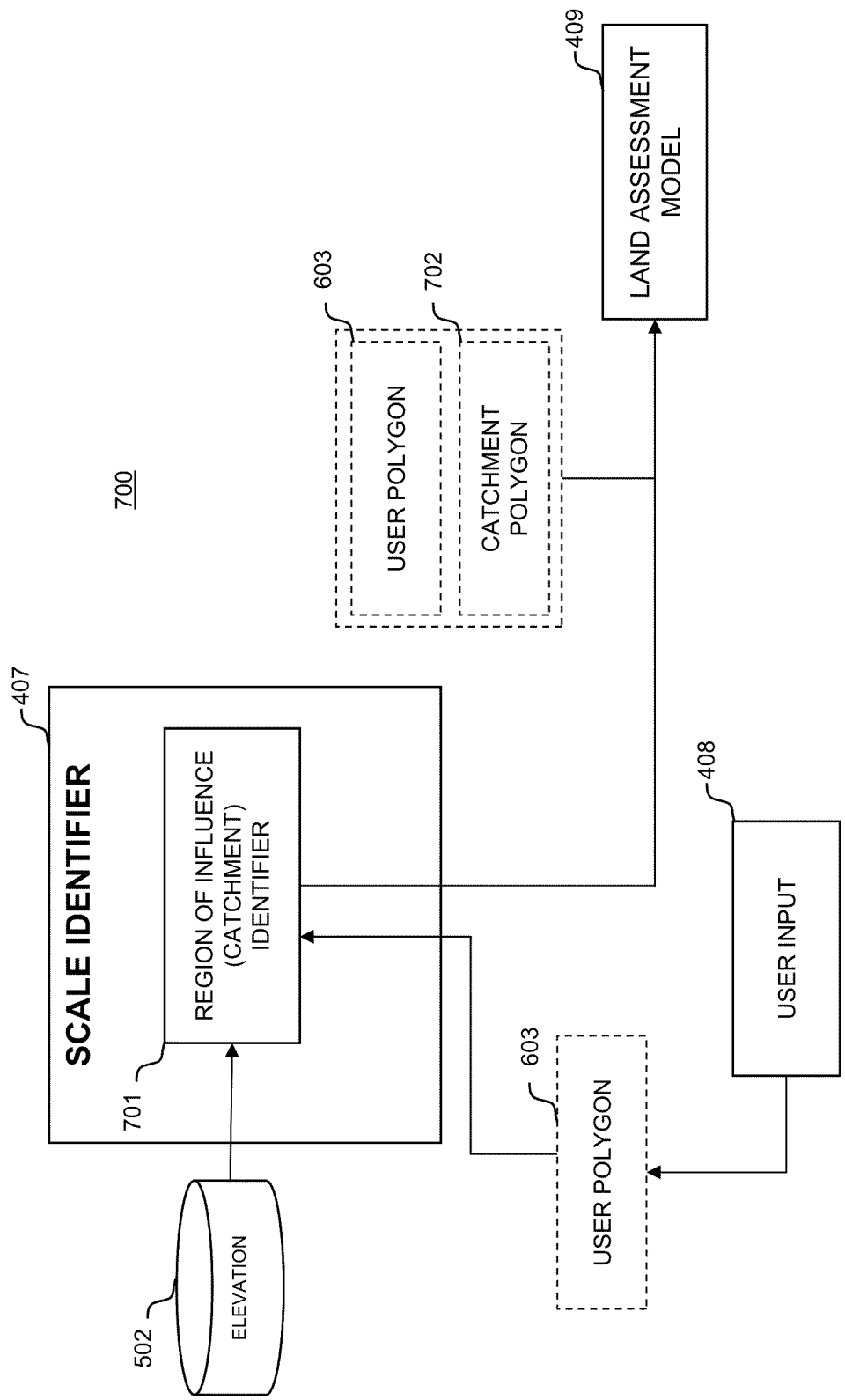
FIG. 7 shows a block diagram illustrating a scale identifier module as a component of the land intelligence system, in accordance with an embodiment of the invention.

FIG. 7 shows a block diagram of a system for determining a region of influence associated with the area defined by the user input, as performed in the scale identifier module 407, according to some embodiments of the invention. In some embodiments of the invention, the scale identifier 407 identifies one or more regions of influence using a region of influence identification process 701. In some embodiments, the region of influence may be represented by a catchment polygon 702, for a given user polygon 603, generated based on elevation data 502. In some embodiments, other data sets such as watershed information may be used, instead of or in addition to elevation data 502, to determine the region of influence 702. In some embodiments of the invention, the region of influence is more commonly defined as a catchment associated with the polygon 603 but may pertain to a larger ecoregion or continent. Catchments are areas of land where runoff collects to a specific zone. This movement is caused by water moving from areas of high energy (elevation) to low energy (elevation) due to the influence of gravity. In some embodiments of the invention, the catchment or region of influence 702 is larger than the user polygon 603 and includes neighbouring areas from which water flows into the area associated with the user polygon 603. Although the specification uses the terms catchment and region of influence interchangeably, these terms are non-limiting and a region of influence may include multiple catchments or larger drainage basins up to the scale of a continent. The region of influence or catchment polygon 702 is subsequently used in the land assessment model 409.

Figure 8:
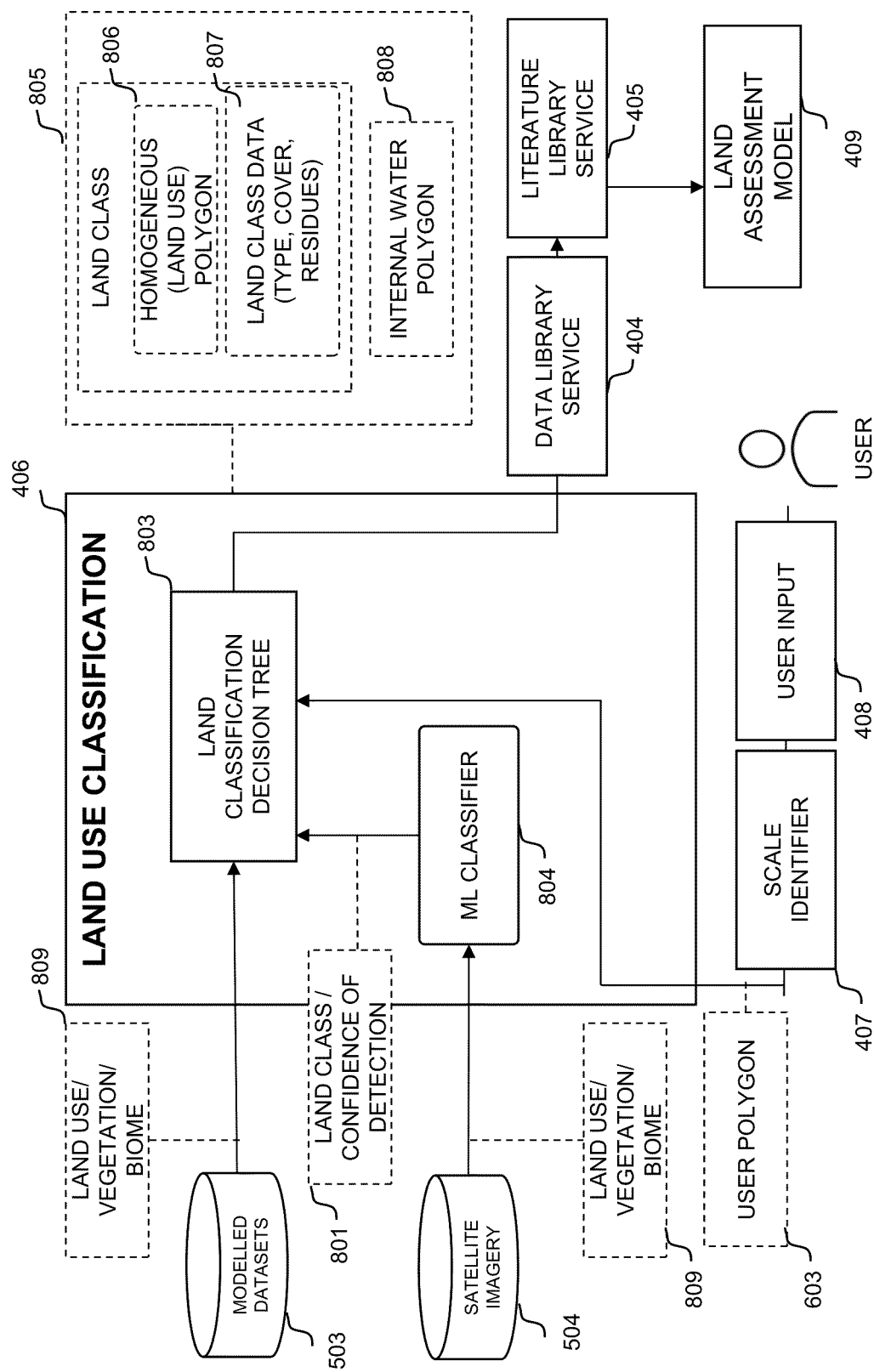
FIG. 8 shows a block diagram illustrating a land use classification module as a component of the land intelligence system, in accordance with an embodiment of the invention.

FIG. 8 shows a detailed block diagram for the land use classification module 406, to identify the land class associated with one or more portions of the user polygon 603. The land use classification module 406 includes training one or more machine learning models using the modelled datasets 503, satellite imagery 504, and land use, vegetation and biome data 809 to predict the land class of different portions of the region of interest (user polygon 603 or region of influence 702). In some embodiments, the land use classification module 406 includes a land classification decision tree-based machine learning model 803 that predicts the most likely land class based on input feature data. In some embodiments, the land classification decision tree-based machine learning model 803 is trained using modelled datasets 503 and input feature data generated by another machine learning classifier 804 to identify the land class of one or more portions of the user polygon 603. In some embodiments of the invention, the one or more portions of the user polygon 603 are defined as 1-5 square km blocks of the user polygon 603 or the region of influence 702.

In some embodiments of the invention, a satellite imagery machine learning classifier 804 is trained on satellite imagery data 504 and land use, vegetation and biome data 809 to determine initial land class predictions for one or more portions of the user polygon. The land use, vegetation and biome data 809 provides ground truth (labeled output classes) for the areas corresponding to the satellite imagery data 504. In some embodiments, the satellite imagery machine learning classifier 804 is a classification model, such as a k-nearest neighbor model or a neural network model, that can account for multi-collinearity in different variables, does not require extensive pre-election and elimination of variables based on the collinearity of the variables, and does not require the data features to be normally distributed. Multicollinearity occurs when two or more independent variables (also known as predictors) are highly correlated with one another. This means that an independent variable can be predicted from another independent variable in the trained model. One goal of training a machine learning model is to model how each independent variable impacts the prediction of the target class. Collinearity in the training data obfuscates the effect of changing one independent variable because the model can not determine whether the desired changes in the target prediction are a result of changing the first independent variable or a correlated independent variable. Machine learning models that work well even in the presence of collinearity do not require extensive data preparation to eliminate correlated variables.

In some embodiments, the satellite imagery data 504 and the land use, vegetation and biome data 809 are used to generate the features (predictors) and the ground truth (desired output class), respectively, for training the satellite imagery machine learning classifier 804. Classification problems in image analysis require, on the algorithmic side, considering complex information embedded in the image data. Satellite images might contain many millions of pixel values in several color channels; their correlation and relationship characterises the desired output class and enables learning appropriate separation criteria to discriminate the desired output class from other classes. It is generally non-feasible to integrate all this information in reasonable running time for classification problems. Therefore, for training machine learning models, image features are extracted as a representatives of each desired output class. These features may include basic features such as pixel color, texture, and edges in the one or more portions of the satellite imagery data 504 and more complex features such as Fourier descriptors, Harris corners or Gaussian-like peaks, which generate a lower dimension representation of the desired class and fall within a characteristic region in the feature space, hopefully differentiated enough from features that describe other classes but similar to features that describe other samples of the same class.

Image features are, loosely speaking, salient points on the image. Ideally, the extracted input features are invariant to image transformations like rotation, translation and scaling. In other words, features of a sample region in a satellite image should not change upon rotation of the image, changing the scale of the image (akin to changing the resolution of the image or the image magnification) or changing the acquisition angle of the satellite based cameras (directly overhead or angular to the captured region). Each set of features corresponding to a data sample may be arranged as a feature vector and annotated with the corresponding output class. In some embodiments, the land classification module 406 uses the land use, vegetation and biome data 809, which provides the land use class for the regions corresponding to the satellite imagery 504, to automatically annotate the extracted input feature sets (feature vectors) with the appropriate desired output class, to form the data set needed to train, validate, and test the machine learning model.

In some embodiments of the invention, the satellite imagery data 504 includes one or more of visible spectral data (red, green, blue bands, for example), short-wave infrared (SWIR) spectral data, near infrared (NIR) spectral data, thermal infrared (TIR) spectral data, etc. In addition to conventional image features such as pixel color, texture, edges etc., discussed above, other input features such as normalized difference moisture index (NDMI) and normalized difference water index (NDWI) are generated from the satellite imagery data 504 to detect moisture levels. NDMI detects moisture levels in vegetation using a combination of near-infrared (NIR) and short-wave infrared (SWIR) spectral bands. NDWI detects moisture levels in vegetation using a combination of near-infrared (NIR) spectral band and green band. A negative value for NDMI or NDWI indicates lower moisture content, indicative of bare soil or low canopy cover, while a positive value indicates vegetation with low water stress. Another feature, the normalized difference vegetation index (NDVI) analyses remote sensing data to assess whether or not the target area being observed contains live green vegetation.

In some embodiments of the invention, the desired land classification output classes from the satellite imagery machine learning classifier 804 include, for example, "bare soil", "arable land", "urban cover", "water body", "crop land" etc. It is obvious to one of ordinary skill in the art that different sets of land classification output classes maybe used, based on the desired application. In some embodiments of the invention, the features extracted from the satellite imagery data 504 are annotated with corresponding ground truth (land classification output classes) obtained from the land use, vegetation and biome data 809 to form the training set of data for training and testing a satellite imagery machine learning classifier 804, such as an artificial neural network.

In the training phase, the features extracted from the satellite imagery data 504 are provided as training data to one or more neural network models as inputs. The ground truth (land classification output classes) obtained from the land use, vegetation and biome data 809 is provided as the target data for the output nodes. The neural network models try to predict the target data from the input features, and use the error in the actual output data versus the target output data to correct themselves (that is, correct the weights and biases for each connected pair of neurons) by adjusting their parameters as more data is input.

In some embodiments, validation and testing of the satellite imagery machine learning classifier 804 is performed to ensure that the model is generalised (it is not overfitted to the training data and can provided similar performance on new data as on the training data). In some embodiments, a portion of the data is held back from the training set for validation and testing. The validation dataset is used to estimate the neural network's performance while tuning the neural network's parameters (weights and biases). The test dataset is used to give an unbiased estimate of the performance of the final tuned neural network model. It is well known that evaluating the learned neural network model using the training set would result in a biased score as the trained model is, by design, built to learn the biases in the training set. Thus, to evaluate the performance of a trained machine learning model, one needs to use data that has not been used for training.

In one embodiment, the data set is divided equally between the training set and the testing set. The neural network models are trained using the training set and their performance is evaluated using the testing set. The best performing neural network model may be selected for use. The neural network model is considered to be generalised or well-trained if its performance on the testing set is within a desired range (error) of the performance on the training set. If the performance on the test set is worse than the training set (the difference in error between the training set and the testing set is greater than a predefined threshold), a two-stage validation and testing approach may be used.

In some embodiments, in a two stage validation and testing approach, the data set is divided between the training set, the validation set, and the testing set. The neural network models are first trained using the training set, then their parameters are adjusted to improve their generalisation using the validation set, and, finally, the trained neural network models are tested using the testing set.

In some embodiments, the data set may be divided equally between the desired training, validation, or testing sets. This works well when there is a large collection of data to draw from. In cases where the collection of data samples is limited, other well known techniques, such as leave one out cross validation and testing or k-fold cross validation may be used to perform validation and testing. Cross-validation is a resampling procedure used to evaluate machine learning models on a limited data sample. The procedure has a single parameter called k that refers to the number of groups that a given data set is to be split into. As such, the procedure is often called k-fold cross-validation. When a specific value for k is chosen, such as k=10, it becomes 10-fold cross-validation.

Cross-validation is primarily used to estimate how the trained model is expected to perform in general when used to make predictions on data not used during the training of the model. The dataset is shuffled randomly and divided into a predefined number (k) of groups. The training and testing process is performed k times, with one of the groups of data being held out as the testing set for each iteration and the remaining k-1 groups being used as the training set. Each model is fitted (trained) on the training set and evaluated (tested) on the test set to determine the level of generalisation of the trained models.

The purpose of k-fold cross validation is not to pick one of the trained models as the final machine learning classifier but, rather, to help determine the model structure and the parameter training process for the machine learning classifier 804. For example, a neural network model can have one or more "hidden" layers of neurons between the input layer and the output layer. Further, different neural network models can be built with different numbers of neurons in the hidden layers and the output layers. In some embodiments of the invention, in the training phase, a plurality of neural network models having different numbers of layers and different numbers of neurons in each layer are generated. Each of the plurality of neural network models is trained using k-fold cross validation, resulting in a score that predicts the skill of each model in extracting the set of concepts that capture the associations and relations present in the set of words and phrases in unseen (future) data. The model (number of layers and number of neurons in each layer) having the highest predictive score is selected and then trained on the entire data set to generate the satellite imagery machine learning classifier 804.

It is obvious to one of ordinary skill in the art that the machine learning model is not limited to neural networks and other machine learning models, such as a Bigram classifier, support vector machine, random forest of decision trees, or k-nearest neighbor, or a combination of different types of machine learning models may be used to classify the satellite imagery data into land use classes.

In some embodiments of the invention, the land use classification system 406 is configured to use the land classification decision tree 803 to output a land class 805, which contains the associated homogeneous (land use) polygon(s) 806 and the land class data (type, cover, residues) 807, along with an internal water polygon(s) 808. The water polygons 808 are used in the land assessment model 409 to identify streams and water bodies. In some embodiments of the invention, the land class/confidence of detection 801 is used to guide the reasoning algorithm in the land classification decision tree 803. It should be noted that the land use classification may be performed on the region of influence polygon 702 instead of the user polygon 603.

Figure 9:
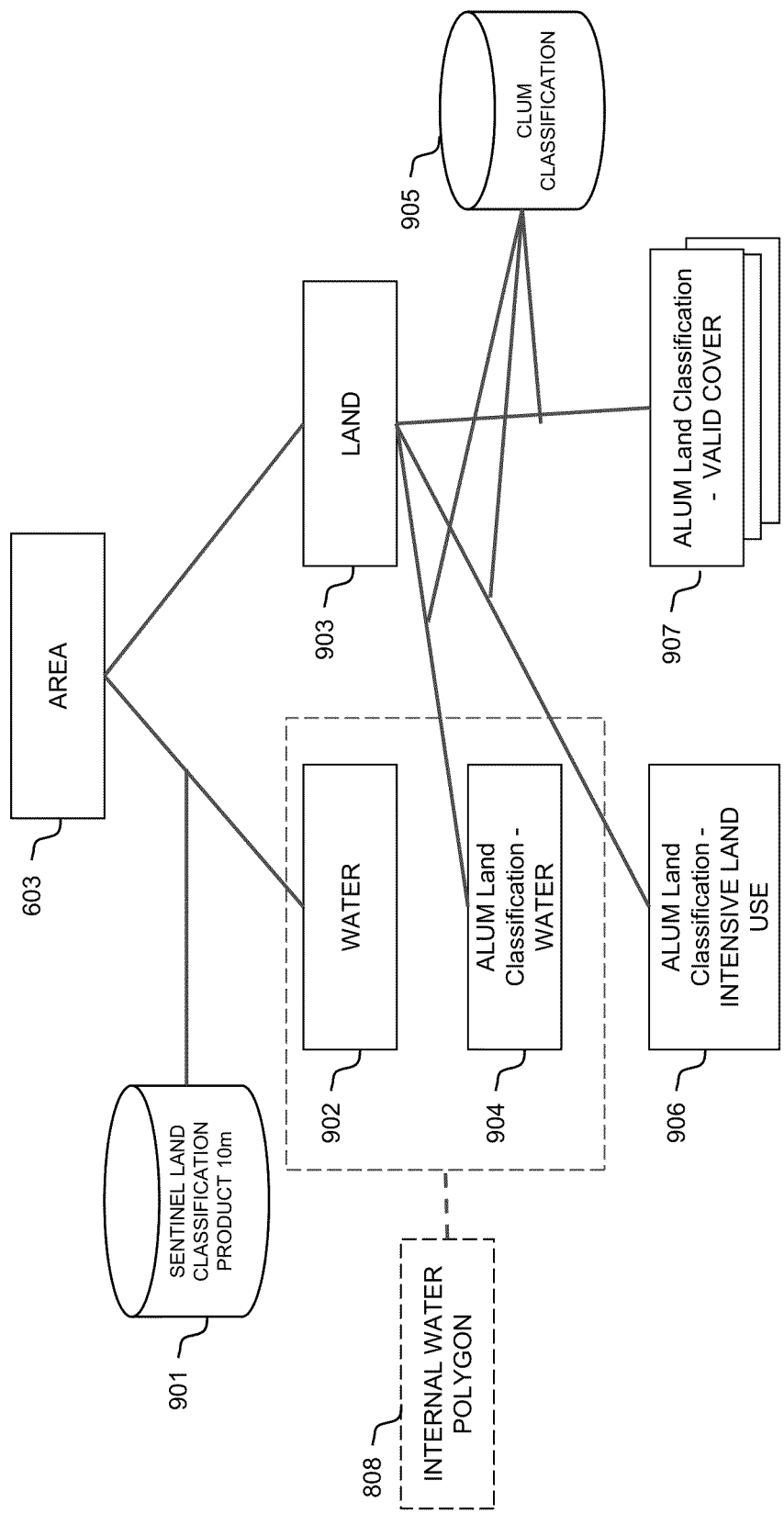
FIG. 9 shows an example of a land classification decision tree used in the land use classification module, in accordance with an embodiment of the invention.

FIG. 9 shows an example of the land classification decision tree 803 in more detail, according to an embodiment of the invention. In some embodiments of the invention, the area defined by the user 603 is filtered using a database such as the sentinel land classification product 901 to identify regions of water 902. In some embodiments of the invention, the user polygon 603 may be represented as a geojson data structure, and is split into two geojson objects; one containing land areas 903 and another representing the areas with water bodies 902. Geojson is an open standard format designed for representing simple geographical features, along with their non-spatial attributes. Geojson features include points (such as addresses and locations), line strings (such as streets, highways and boundaries), polygons (countries, provinces, tracts of land), and multi-part collections of these types. It is obvious to one of ordinary skill in the art that other formats may be used to represent the user polygon 603. It should be noted that the filtering operation may be performed on the region of influence polygon 702 instead of the user polygon 603.

In some embodiments of the invention, the land object 903 is further filtered using official databases such as the Catchment Scale Land Use of Australia (CLUM) dataset 905, provided by the Australian Bureau of Agricultural and Resource Economics and Sciences. The CLUM dataset permits the land 903 to be split into three categories; Land Use – Water 904, Intensive Land Use 906, and Valid Land Cover 907. In some embodiments of the invention, parts of the land that have been classified to be water using CLUM 904 are merged with the water areas 902 filtered in the first classification 901 to generate the internal water polygons 808. In some embodiments of the invention, portions of the user polygon 603 that are identified as Valid Land Cover 907 define a set of classes 805 that the land assessment model 409 may be run against.

In some embodiments of the invention, the land classification decision tree 803 is generated using a machine learning model, such as a random forest of decision tress. The random forest of decision tress is an example of a supervised machine learning algorithm that is used widely in classification problems. During the training phase, the random forest algorithm builds a plurality of decision trees on different samples and takes their majority vote for classification. Classification is the task of categorising and assigning labels to groups of features or vectors within a dataset dependent on particular rules. The labeled data is stored as structured data to be used for training other machine learning models, including the land classification decision tree model 803.

In some embodiments, training data for the land classification decision tree model 803 is obtained by combining the output land classes from the satellite imagery machine learning classifier 804 with features extracted from the modelled datasets 503. The modelled datasets provide input features related to elevation and slope of the land areas, soil characteristics, temperature and rainfall distribution over time, etc. As with the satellite imagery machine learning classifier 804, the ground truth (the target land classification output from the decision tree) is obtained from the land use, vegetation and biome data 809.

In some embodiments, in the training phase for the land classification decision tree model 803, a forest of decision trees is randomly generated (with different linkages and weights between features) using the input features from the machine learning classifier 804 and the modelled datasets 503. The forest of decision trees are evaluated using the ground truth to prune poorly-performing decision trees and add new decision trees. This process is repeated until a convergence criterion (such as a predetermined number of decisions trees whose error is below a prescribed threshold) is met. In the simplest case, a single decision tree may be selected and used as the land classification decision tree 803. In other embodiments, a collection of decision trees may be selected to provide the land classification decision tree 803, and voting or another combination mechanism can be used to combine the predicted outputs from the collection of decision trees.

Figure 11:
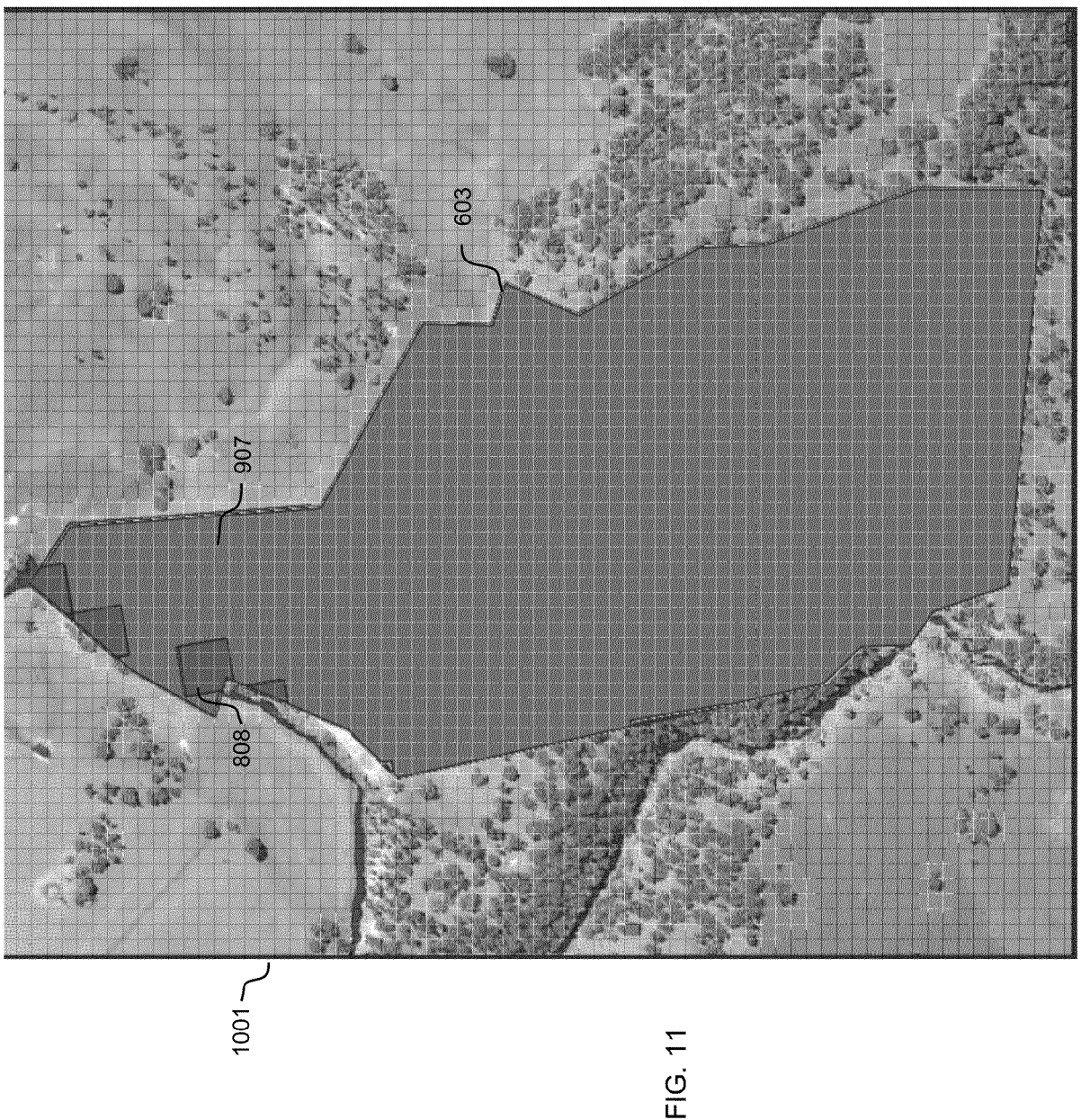
FIG. 11 shows an example of filtered satellite data after land use classification, in accordance with an embodiment of the invention.

FIG. 11 shows an example of filtered land cover 903 for the input image in FIG. 10, after being processed by the decision tree 803. The internal water polygons 808 are represented by darker shaded pixels, and the valid land areas 907 are represented by the lighter shaded pixels within the user defined area 603.

Figure 12:
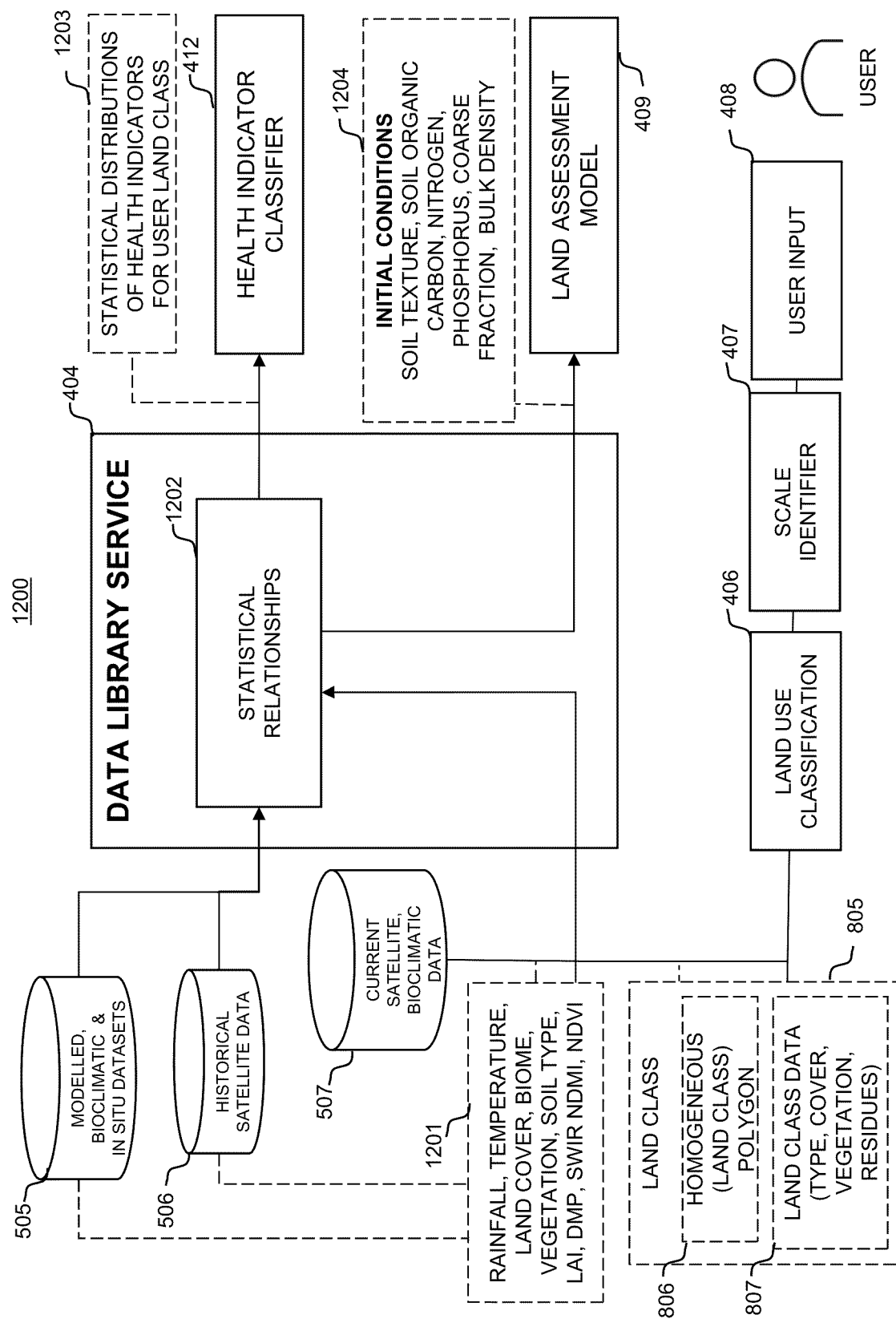
FIG. 12 shows a block diagram illustrating a data library service module as a component of the land intelligence system, in accordance with an embodiment of the invention.

FIG. 12 shows a detailed block diagram of the data library service module 404, according to some embodiments of the invention. The data library service module 404 combines modelled, bioclimatic and in-situ datasets 505 with static, historical datasets 506 generate statistical relationships 1202. In some embodiments of the invention, the statistical relationships 1202 may be generated and stored in advance of use of the data library service module 404 in a training phase. In some embodiments, a set of fuzzy classifiers may be trained to generate the statistical relationships 1202. The training data for the fuzzy classifiers is extracted from the modelled, bioclimatic and in-situ datasets 505, the historical datasets 506, and the current satellite and bioclimatic datasets 507. In some embodiments, fuzzy classifiers that predict the statistical relationships 1202 between a plurality of state variables (such as but not limited to temperature, rainfall, soil composition, soil pH, land cover, land use etc.) and a plurality of properties (such as soil organic carbon, nitrogen, phosphorus, coarse fraction, bulk density etc.) are trained using the extracted training data. The training data includes features corresponding to the plurality of state variables and the plurality of properties as inputs to the fuzzy classifier machine learning model. During the training phase, the fuzzy classifiers learn a soft labeling where the sets of input features may be assigned to classes that are not mutually exclusive. So, for example, a feature set having some specific measured distributions for rainfall, temperature, soil pH, and land cover may me mapped to an output distribution over a range of soil organic carbon concentration, with associated probability or likelihood of different soil organic carbon concentrations within the range. The output distribution (statistical relationship) from the fuzzy classifier may be a continuous function, where the value of the function at any given point (predicted concentration) in the range corresponds to the probability of that predicted concentration.

Training and testing of the fuzzy classifiers is performed similar to the training and testing methodology for the satellite imagery machine learning classifier 804 discussed above. The training data (distribution of state variables and distribution of soil properties) for each land area is extracted from the modelled, bioclimatic and in-situ datasets 505, the historical datasets 506, and the current satellite and bioclimatic datasets 507. The main difference between the neural network model discuss above with respect to the machine learning classifier 804 and the fuzzy classifiers is error function for evaluating the performance during training.

In some embodiments, the fuzzy classifiers are based on a K-nearest neighbor machine learning model. Unlike classical K-nearest neighbour, where a single value for each property is selected as the label for a particular input feature set, based on the values of the majority of its K nearest neighbour feature sets, in fuzzy K-nearest neighbour classification, a distribution corresponding to all values of the K nearest neighbour feature sets is generated. In some embodiments, during the training phase, different values of K are evaluated to determine the optimal value of K for generating the statistical distributions. Higher values of K make the algorithm more complex, leading to convergence issues and impracticability. Lower values of K may not adequately capture the variability in the statistical relationships between the state variables and the soil properties. Accordingly, during training, various validation and testing approaches, such as n-fold cross validation (similar to the k-fold cross validation discussed earlier), are used to evaluate various values of K. The training set is divided into n training and testing groups, and the performance of different values of K between the training and testing groups is compared. The value of K that provides the least "error" between the training and testing groups of data is selected for the fuzzy classifiers.

The statistical relationships 1202, trained using the methodology described above, provide the initial conditions for the land assessment model 409 through a querying process, according to some embodiments of the invention. In some embodiments of the invention, the land class 805 and the associated homogenous (land class) polygon(s) 806 and land class data (type, cover, vegetation, residues) 807, along with current satellite and bioclimatic data 507, is used to query the statistical relationships 1202 in the data library service 404. Examples of the data 1201 used to configure and query the statistical relationships 1202 may include, but are not limited to, rainfall, temperature, land cover, biome, vegetation, soil type, leaf area index, dry matter productivity, short wave infrared, normalised difference moisture index, normalised difference vegetation index. In some embodiments of the invention, the data library service module 404 is configured to use the statistical relationships 1202 to supply at least some of the initial conditions for various parameters represented in the land assessment model 409. These parameters include land properties such as soil organic carbon concentration, nitrogen concentration, phosphorus concentration, soil texture, coarse fraction and bulk density.

In some embodiments of the invention, the data library service system 1200 may be further configured to use the statistical relationships 1202 to contextualise the outputs from the spatially explicit model 409 in the health indicator classifier 412, by passing the statistical distributions 1203 of health indicators for user land class.

Figure 13:
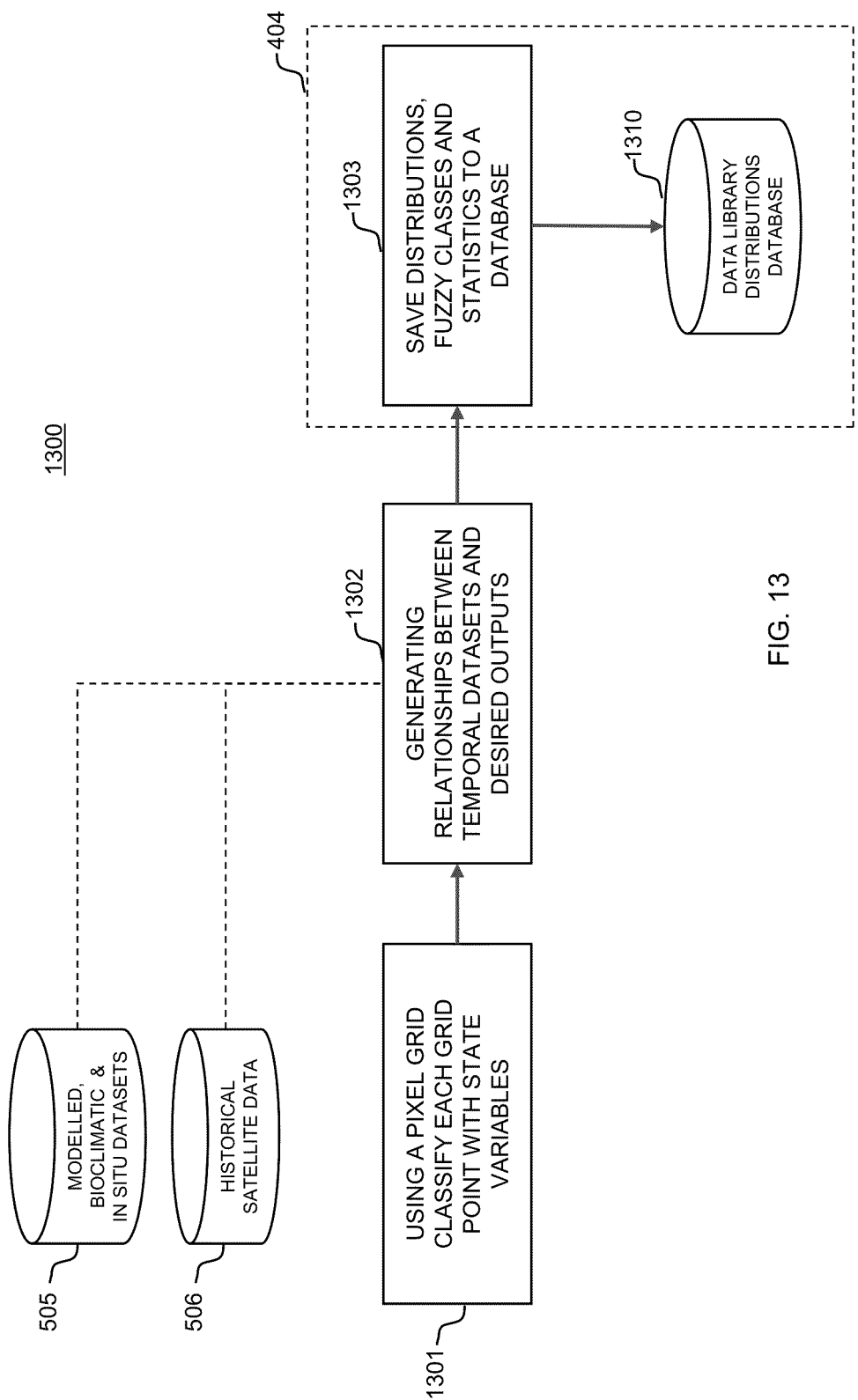
FIG. 13 shows a flow diagram of a method of generating the data library service, in accordance with an embodiment of the invention.

FIG. 13 shows an example of a method 1300 for generating the statistical relationships 1202 of the data library service module 1200. In some embodiments of the invention, an area of land is divided into a plurality of cells. In step 1301, using a grid of pixels, each cell of the land area is classified using state variables such as region, soil type, biome, land cover, vegetation and lithology. In step 1302, statistical relationships 1202 are generated between temporal datasets such as historical satellite data 506 and health indicators 2202 such as soil organic carbon. In step 1303, the distributions, fuzzy classes and statistics associated with these relationships 1202 are saved to a database 1310. In some embodiments, the data library distributions saved in the database 1310, are stored as a set of matrices. According to some embodiments of the invention, the relationships 1202 include a mix of statistical distributions and multivariate regressions.

Figure 14:
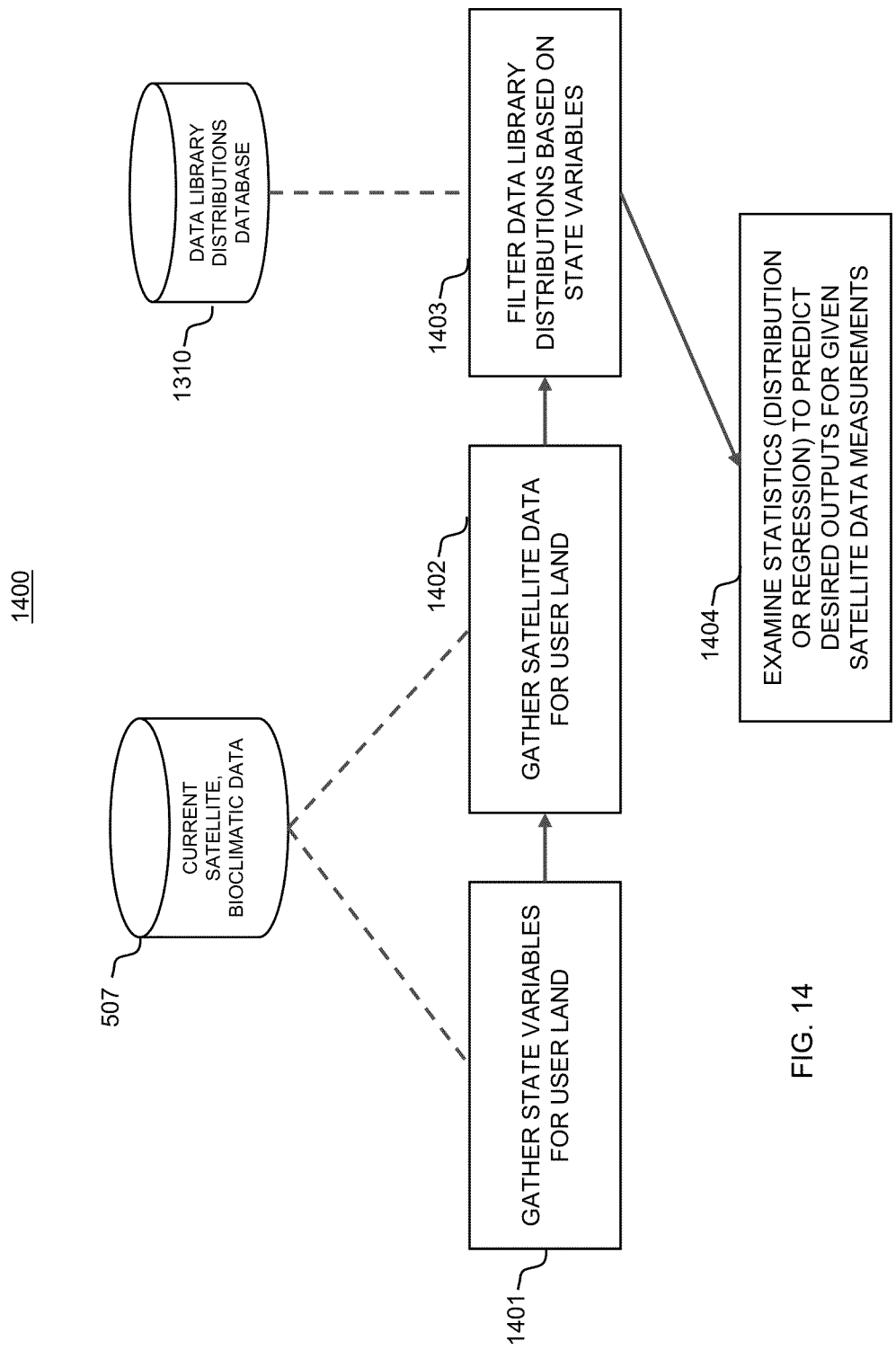
FIG. 14 shows a flow diagram of a method of query processing of the data library service, in accordance with an embodiment of the invention.

FIG. 14 shows an example method 1400 for the querying process of the data library service module 404. In some embodiments of the invention, once the data library service module 404 has gone through the data library building phase using method 1300, the data library service module 404 can be queried using method 1400 to generate statistical distributions for the user polygon 603 or region of influence polygon 702. In some embodiments of the invention, in step 1401, state variables are gathered for the user defined land 603 or region of influence 702. In step 1402, satellite data 507 are gathered for the user defined land 603 or region of influence 702. In step 1403, distributions in the data library distributions database 1310 are filtered based on the user's state variables gathered in step 1401 and the associated satellite data gathered in step 1402. In step 1404, distribution or regression statistics for the user defined land 603 or region of influence 702 are generated to use as initial conditions 1203 for the land intelligence system 403 and for the health indicator classifier module 412.

Figure 15:
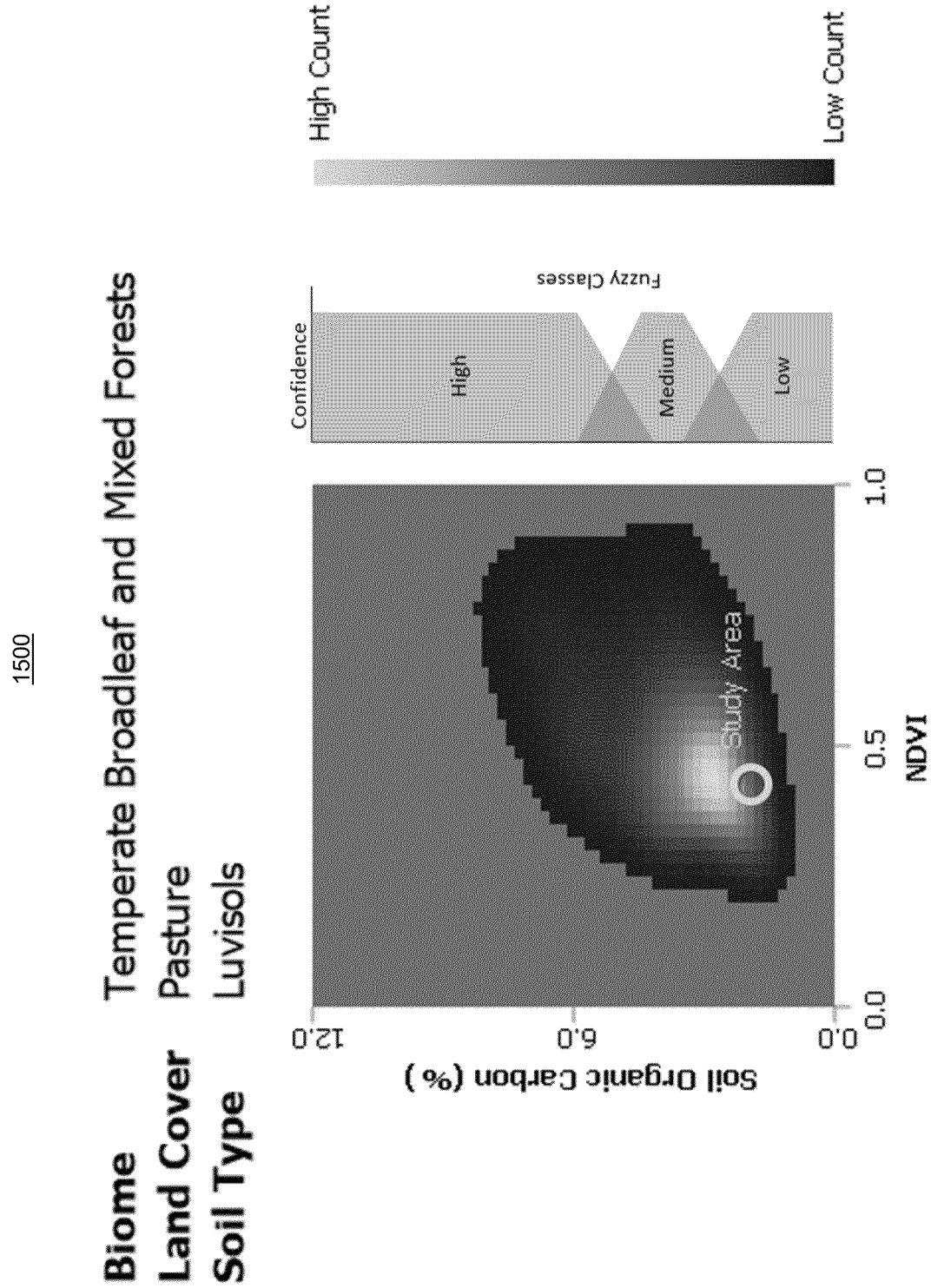
FIG. 15 shows an example of statistical relationships and fuzzy classes generated and stored in the data library service, in accordance with an embodiment of the invention.

FIG. 15 shows an example of a statistical relationship 1500 included in the statistical relationships 1202. This example 1500 shows the distribution of organic carbon density for a range of NDVI measurements for a given biome (Temperate Broadleaf and Mixed Forests), land cover (Pasture), soil type (Luvisol), the fuzzy classes of high to low confidence of the distribution and overlaps between classes. The median of the study area is indicated by a circle on the 2D distribution.

Figure 16:
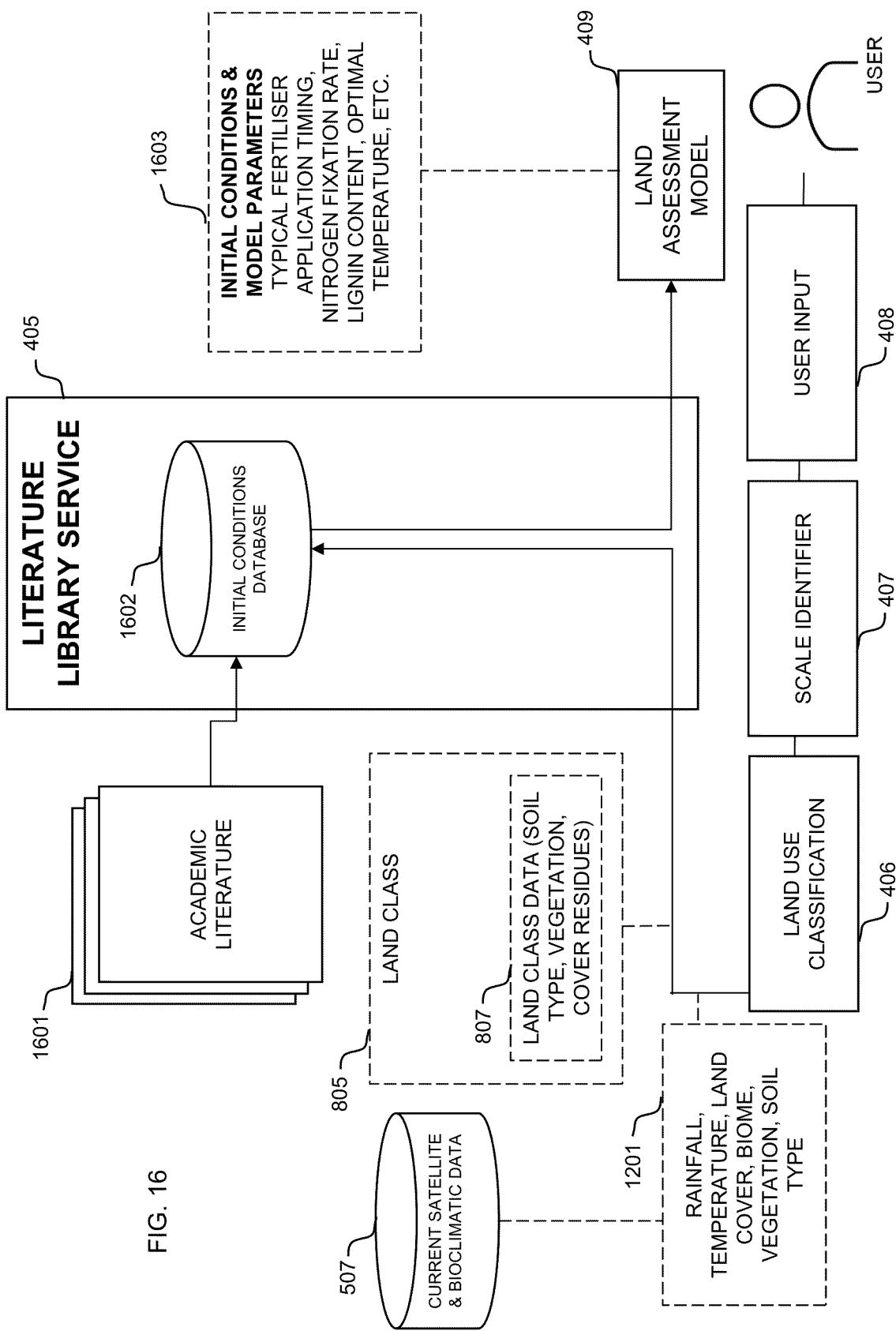
FIG. 16 shows a block diagram illustrating a literature library service module as a component of the land intelligence system, in accordance with an embodiment of the invention.

FIG. 16 shows a detailed block diagram for the literature library service module 405, which provides some of the initial conditions and model parameters 1603 for the land assessment model 409, in some embodiments of the invention. According to some embodiments of the invention, academic literature 1601, which can include but is not limited to textbook sources, academic papers and published trials, is used to configure the initial conditions database 1602. In some embodiments of the invention, the literature library service module 405 may be further configured to query the initial conditions database 1602 with a set of state variables that include but are not limited to those defined within the land class 805, and more specifically the land class data (soil type, vegetation, cover residues) 807, and current satellite & bioclimatic data, which include but are not limited to rainfall, temperature, land cover, biome, vegetation and soil type 1201. In this regard, the methods for building and querying the initial conditions database 1602 are similar to the methods 1300 and 1400 for building and querying the statistical relationships 1202 included in the data library service module 404.

Figure 17:
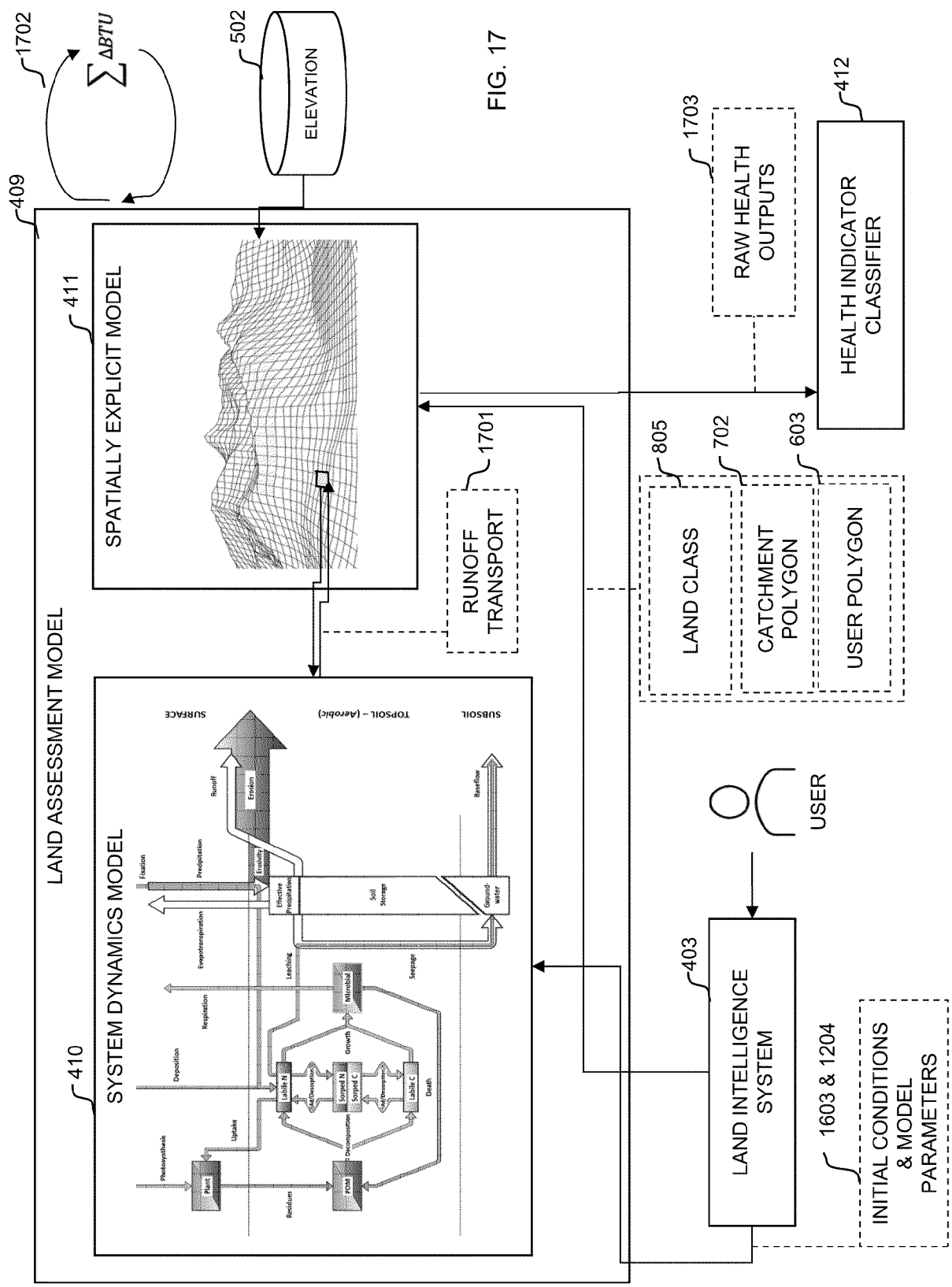
FIG. 17 shows a block diagram illustrating a land assessment model to generate health indicator classifiers, in accordance with an embodiment of the invention.

FIG. 17 shows a detailed block diagram of the land assessment model 409 and its use in generating information used by the health indicator classifier module for current conditions and future climate and land management scenarios 412. In some embodiments of the invention, the land assessment model 409 includes a system dynamics model 410 and a spatially explicit model 411. According to some embodiments of the invention, the automatic natural capital measurement system 400 is configured so the initial conditions for the system dynamics model 410 and the spatially explicit model 411 are supplied by the land intelligence system 403, which includes the initial conditions and model parameters 1603, 1204 for the system dynamics model 410, and the land class 805, catchment polygon, 702, user polygon 603, and elevation data 502 for the spatially explicit model 411.

In some embodiments of the invention, the spatially explicit model 411 is initially configured using the land class 805, catchment polygon 702, and elevation data 502 to define the properties of a plurality of basic spatial units (BSUs). BSU's are depicted as pixels or cells in the spatially explicit model illustration 411 in FIG. 17. In some embodiments BSU's may either be triangular, square, hexagonal or custom polygons. The BSU's represent a segmentation of the catchment polygon 702 (or user polygon 603) into a plurality of regular or irregular segments. In some embodiments, each BSU or segment may be considered to have a uniform average elevation within the segment or BSU.

In some embodiments of the invention the Digital Elevation Model (DEM) from elevation data 502 that is bounded by the catchment polygon 702 configures the flow sequence which describes the order in which cells of the spatially explicit model are processed. According to some embodiments of the invention, the land assessment model 409 is configured to run the system dynamics model 410 and spatially explicit model for a specified number of timesteps, each timestep being denoted as a Basic Temporal Unit (BTU). This recursive operation 1702 simulates the transport of material through the BSUs over time. In some embodiments of the invention, for each iteration 1702, runoff, including water, nutrient, and sediment transport 1701 is transported to adjacent cells after each step in the flow sequence.

In some embodiments of the invention, the flow sequence is initialised to identify the first BSU or highest order BSUs, those with no inflow from other BSUs. Within each iteration 1702, the flow sequence starts at the initialised BSUs and simulates the transport of runoff to adjacent cells, based on the order. The flow sequence ends when all the lowest order BSUs, those with no outflows, have been processed. At the end of each iteration, the properties of the system dynamics model 410 and the spatially explicit model 411 are updated based on the transport simulation. According to some embodiments of the invention, once the land assessment model 409 has executed all iterations of the BSUs for the specific number of BTUs, a plurality of raw health outputs 1703, corresponding to the properties of user polygon 603, are supplied to the health indicator classifier 412.

Figure 18:
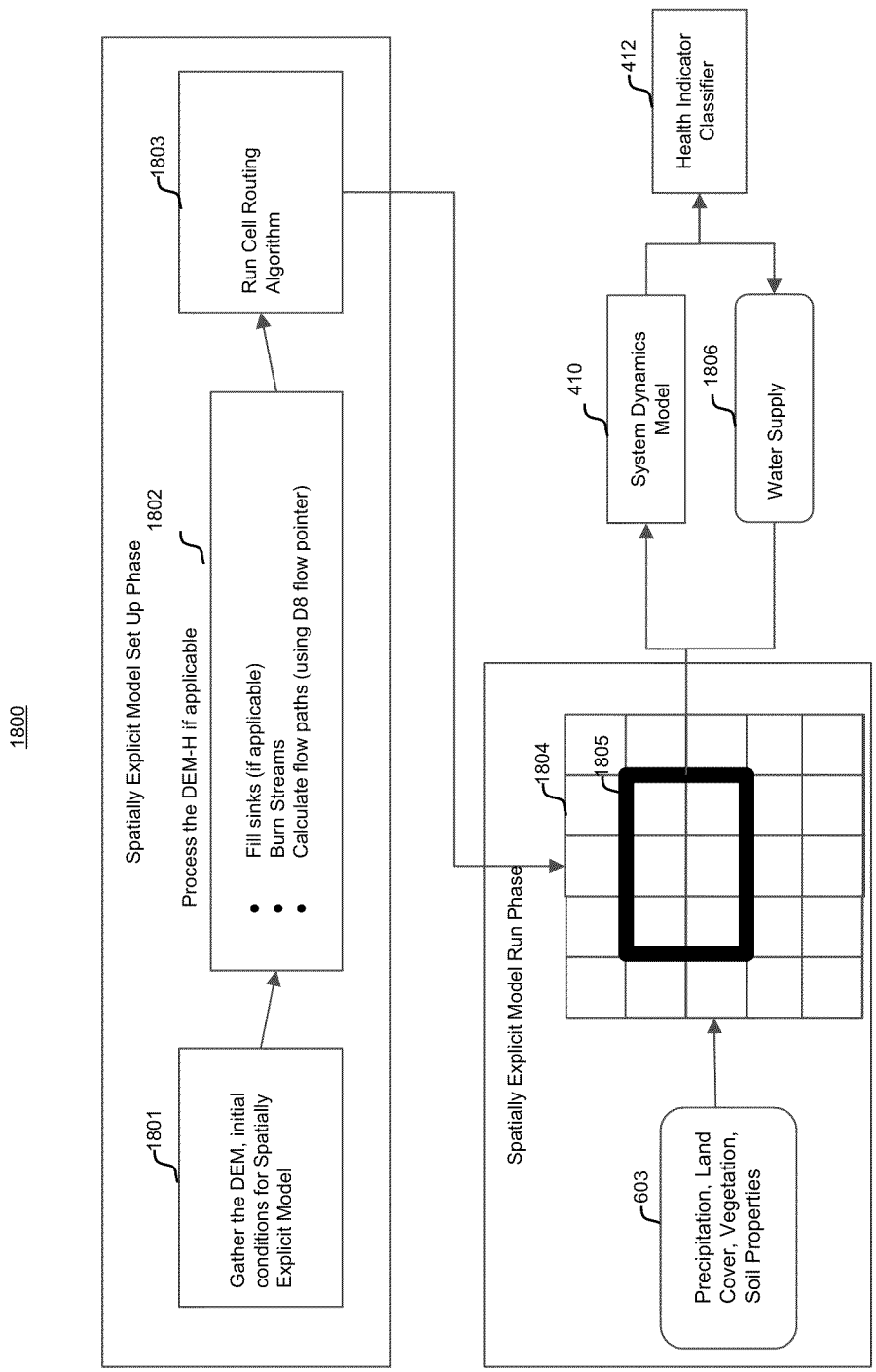
FIG. 18 shows a flow diagram of a method of initialising and running a spatially explicit model, in accordance with an embodiment of the invention.

The flow sequence may be simulated using various hydrology models that describe the movement, distribution, and management of water. FIG. 18 shows a flow diagram of one example method 1800 of initialising and running the spatially explicit model to simulate the flow sequence based on Strahler orders. In mathematics, the Strahler number of a mathematical tree is a numerical measure of its branching complexity that define stream size based on a hierarchy of tributaries. According to some embodiments of the invention, the DEM (elevation data) and initial conditions for the spatially explicit model are gathered in step 1801. In step 1802, various operations are performed on the data, including but not limited to filling sinks, burning streams, and calculating flow paths. In step 1803, the cell routing algorithm transports the water, sediment or nutrient from a cell directly to a stream of a certain Strahler order. According to some embodiments of the invention, in step 1804, all the cells, in a catchment 603 are mapped to a cell corresponding to the stream. According to some embodiments of the invention, in step 1805, the mapped cells and water supply data 1806 are then ingested by the system dynamics model 410. According to some embodiments of the invention, the outputs from the system dynamics model 410 are then ingested by the health indicator classifier 412.

In some embodiments of the invention, the system dynamics model includes a plurality of modules that simulate interactions between various properties of the land, such as water cycle, nutrient cycle, erosion, soil characteristics etc.

Figure 19:
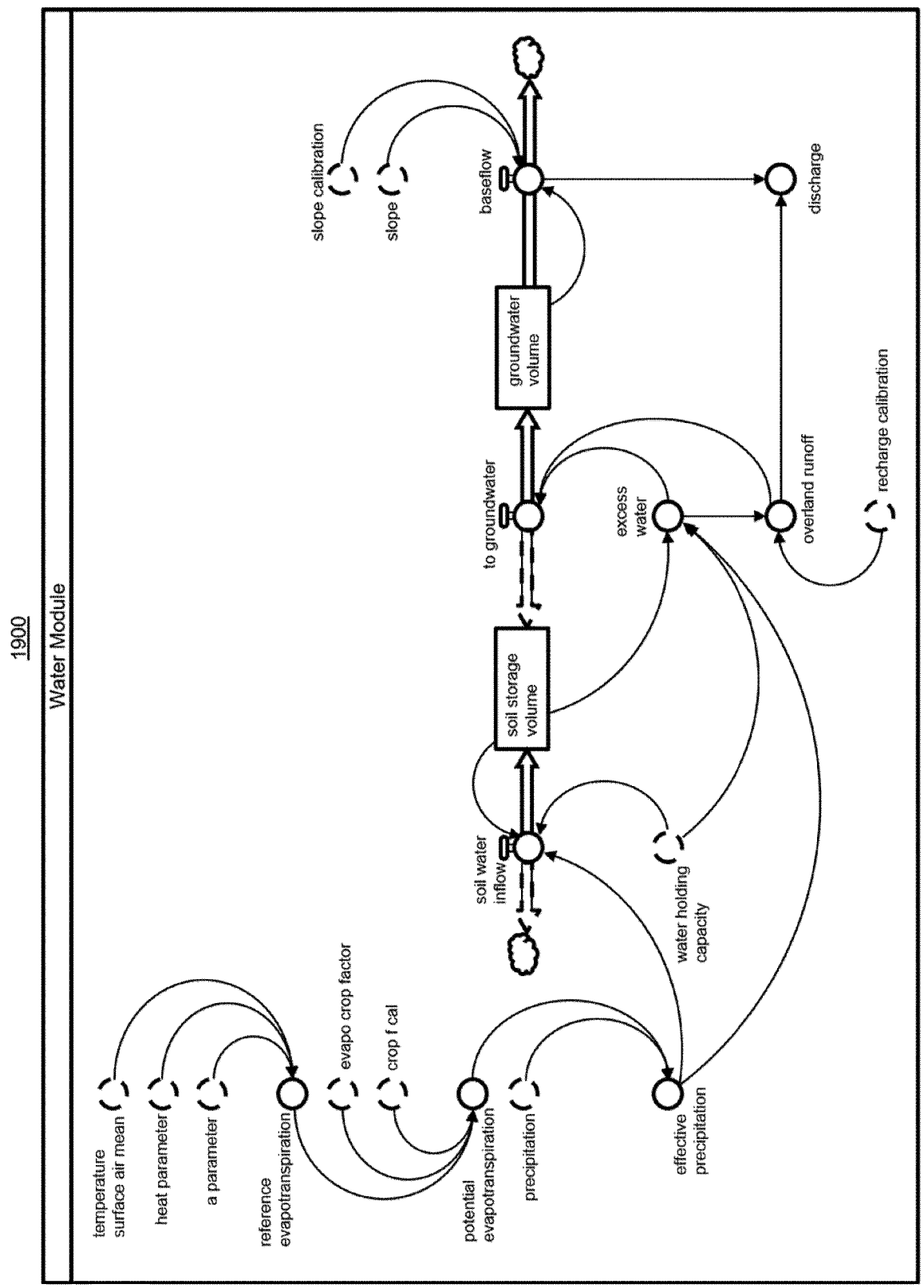
FIG. 19 shows an example of a module in a system dynamics model included in the land assessment model, in accordance with an embodiment of the invention.

FIG. 19 shows an example of a water module 1900 included in the system dynamics model 410. In some embodiments on the invention, the water module 1900 is describes the associations between various factors that govern the movement of water in soil in an area of land such as storage volume, discharge, runoff and recharge. Similar modules are generated to model other dynamic properties of an area of land.

Figure 20:
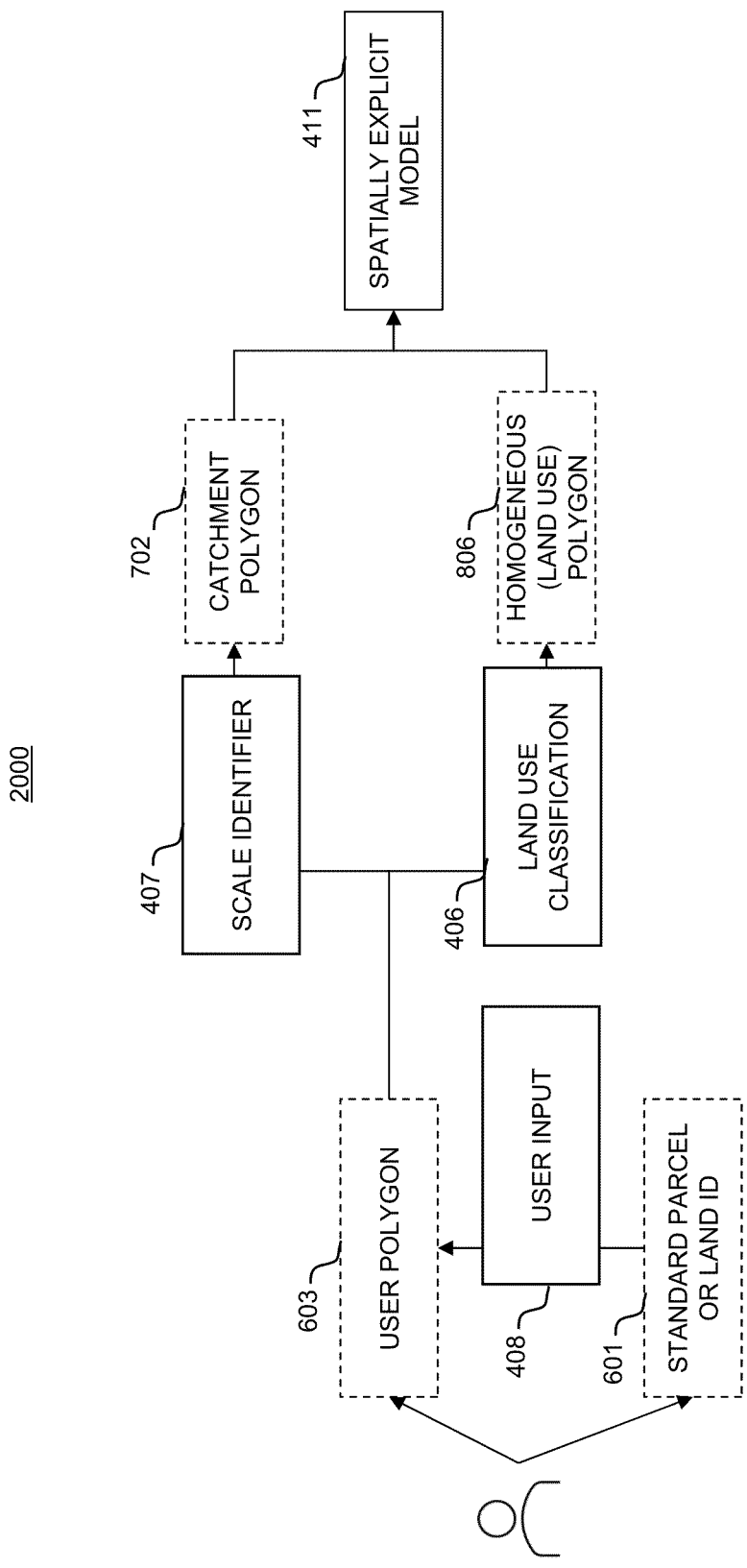
FIG. 20 shows a block diagram of a portion of the automatic natural capital measurement system for generating the spatially explicit model, in accordance with an embodiment of the invention.

FIG. 20 shows a block diagram of a sub-system 2000 to generate the spatially explicit model 411. According to some embodiments of the invention, in the user input module 408, a user can select an area 301 by inputting the boundaries as a polygon 603 or as the standard parcel or land ID 601, which can look up the boundaries to define the area 301 in a national database or service. According to some embodiments of the invention, the user polygon 603 is expanded to generate the catchment polygon 702, using the scale identifier module 407. The homogenous land use polygon 806, obtained by filtering the user polygon 603 or catchment polygon 702, is generated using the land use classification module 406. According to some embodiments of the invention, the catchment polygon 702 and the homogenous land use polygon 806 are used to initialise the spatially explicit model 411.

Figure 21:
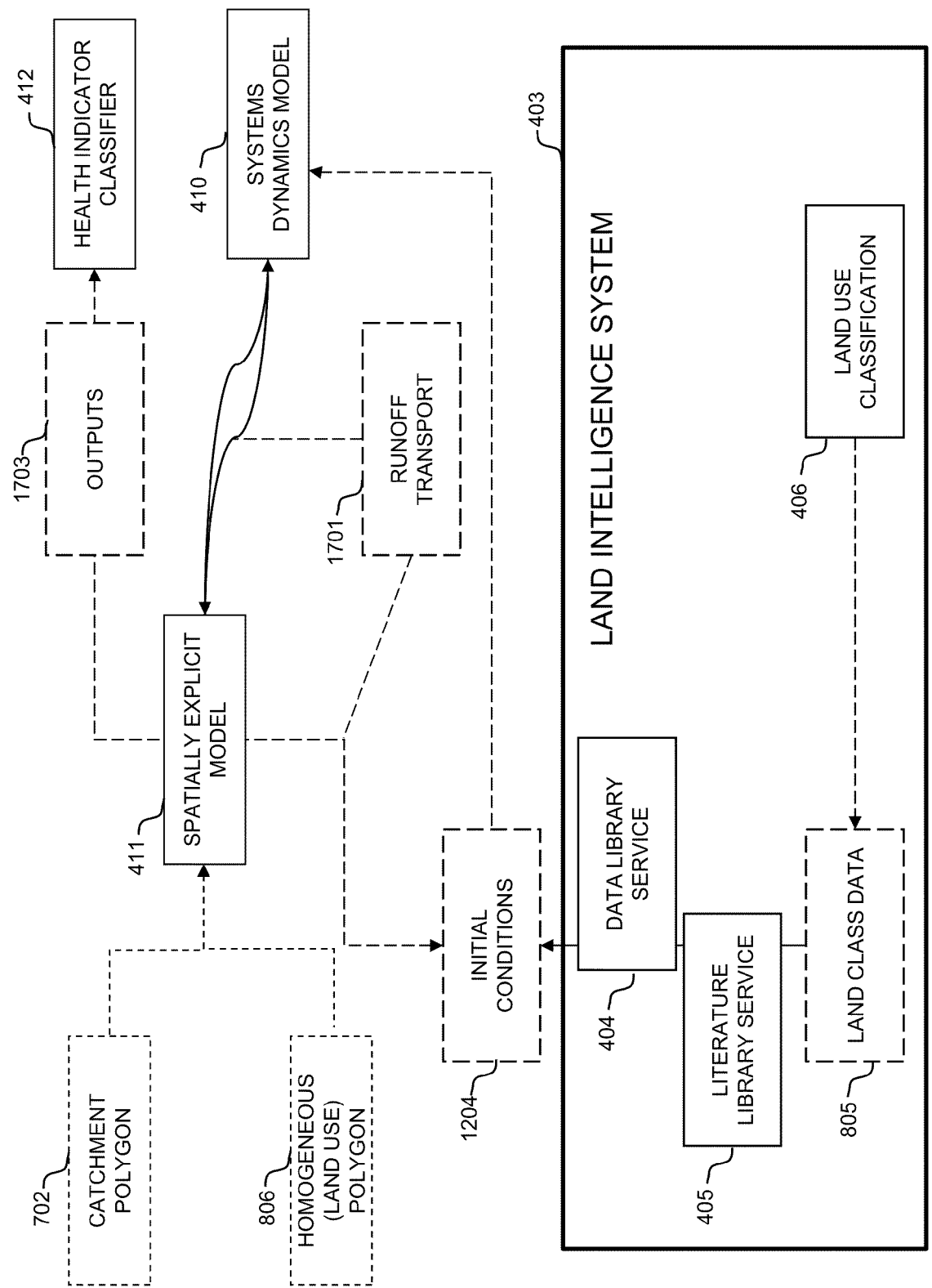
FIG. 21 shows a block diagram of a portion of the automatic natural capital measurement system for initialising the land assessment model, in accordance with an embodiment of the invention.

FIG. 21 shows a block diagram of a process of defining the initial conditions for the system dynamics model 410 and execution of the land assessment model 409. According to some embodiments of the invention, the catchment polygon 702 is fed into the spatially explicit model 411 to define the BSUs or pixels that are relevant to the user defined polygon 603. According to some embodiments of the invention, the homogenous (land use) polygon 806 is fed into the spatially explicit model 411 to determine the target region for analysis. According to some embodiments of the invention, the spatially explicit model 411 represents a network of BSUs or pixels that transport nutrient, sediment, and water from one BSU or pixel to neighbouring BSUs or pixels. According to some embodiments of the invention, once the flow sequence or order of pixel transport is established, the system dynamics model 410 is triggered to run on each pixel using the initial conditions 1204 gathered by the land intelligence system 403. According to some embodiments of the invention, the land intelligence system 403 gathers the initial conditions 1204 from the data library service 404, and the literature library service 405, which are built using the land class data 805 from the land use classification 406. According to some embodiments of the invention, in addition to the initial conditions 1204 gathered by the land intelligence system 403, information on properties such as, but not limited to, sediment, nutrient and water is added to the initial conditions, which informs the runoff transport 1701 of the system dynamics model 410. According to some embodiments of the invention, the outputs from the single pixel and single day system dynamics model run 403 are fed back into the spatially explicit model 411 to be stored in a matrix and one time step for one pixel has now been completed. According to some embodiments of the invention, the previous steps are repeated until all pixels for all time steps have been executed.

According to some embodiments of the invention, the system dynamics model produces runoff data 1701 which is used in adjacent pixels. According to some embodiments of the invention, once all pixels have been executed for all the required time steps, the information stored in the matrix in the spatially explicit model 411 is passed as raw health indicator outputs 1703 to the health indicator classifier module 412.

Figure 22:
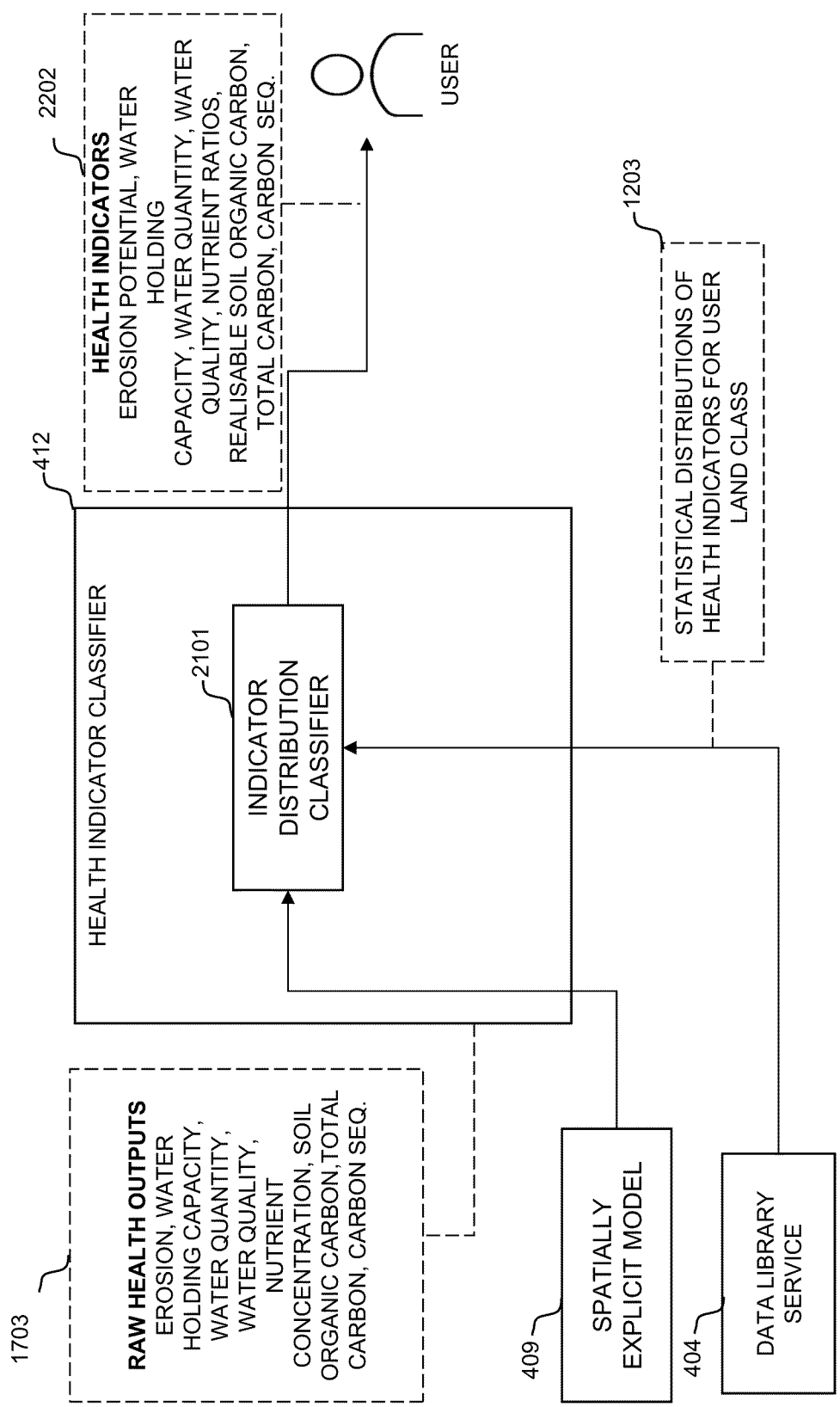
FIG. 22 shows a block diagram illustrating a health indicator classifier module of the automatic natural capital measurement system, in accordance with an embodiment of the invention.

FIG. 22 depicts a block diagram of the health indicator classifier module 412 in more detail, according to some embodiments of the invention. In some embodiments of the invention the health indicator classifier module 412 is configured to take outputs in the form of raw heath outputs 1703 from the land assessment model 409, and evaluate the health indicators 2202 using statistical distributions of health indicators for user land class 1203 from the data library service 404. In some embodiments of the invention, the health indicators 2202 are displayed on a user interface to the user 401, or stored offline for subsequent use.

Figure 23:
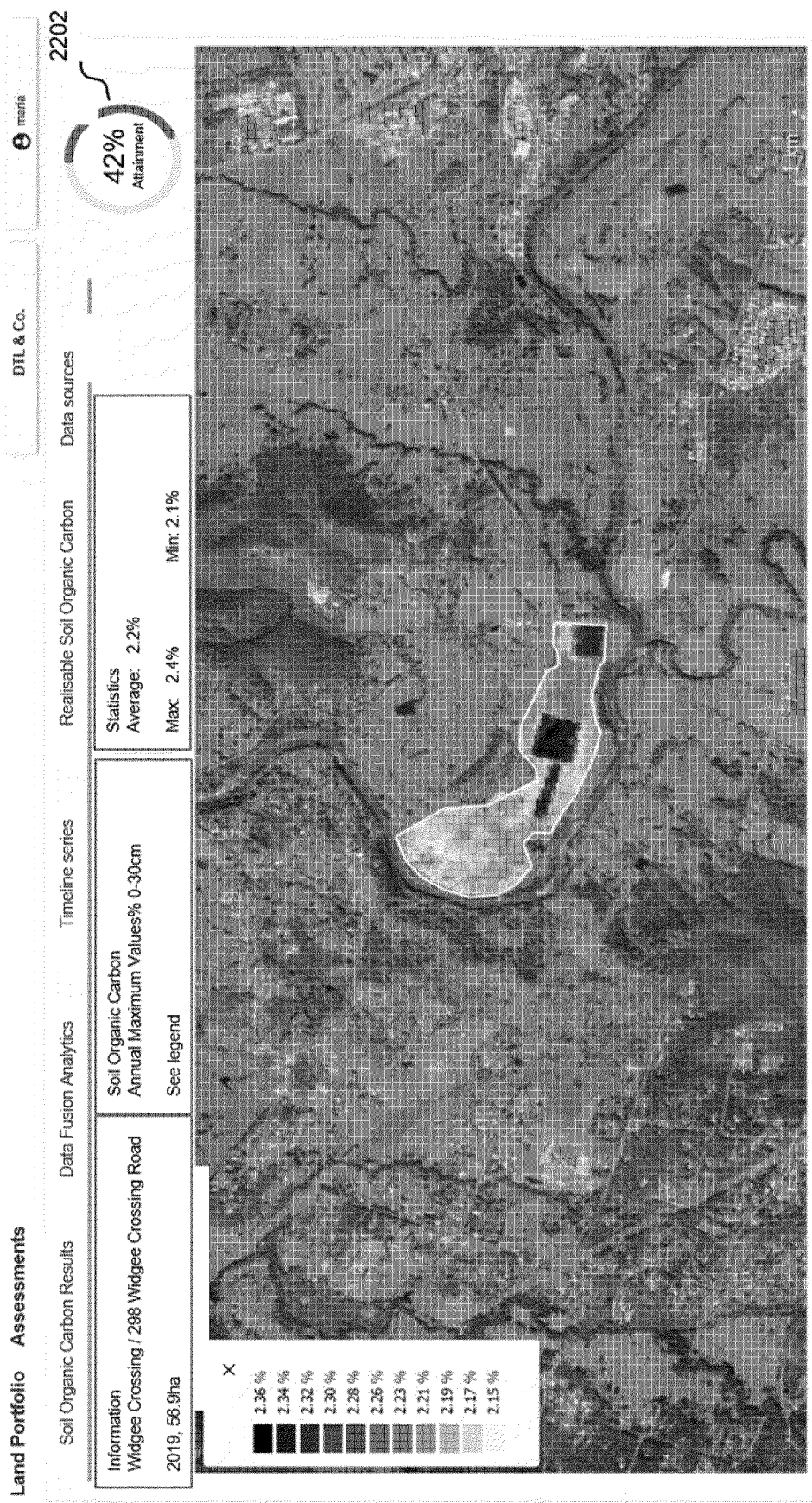
FIG. 23 shows an example of generated health indicator output from the automatic natural capital measurement system, in accordance with an embodiment of the invention.

FIG. 23 shows an example of a health indicator 2202 generated by the land intelligence system 403. According to some embodiments of the invention, the health indicator 2202 for the analysed area 603 is the attainment of the realisable soil organic carbon.

Figure 24:
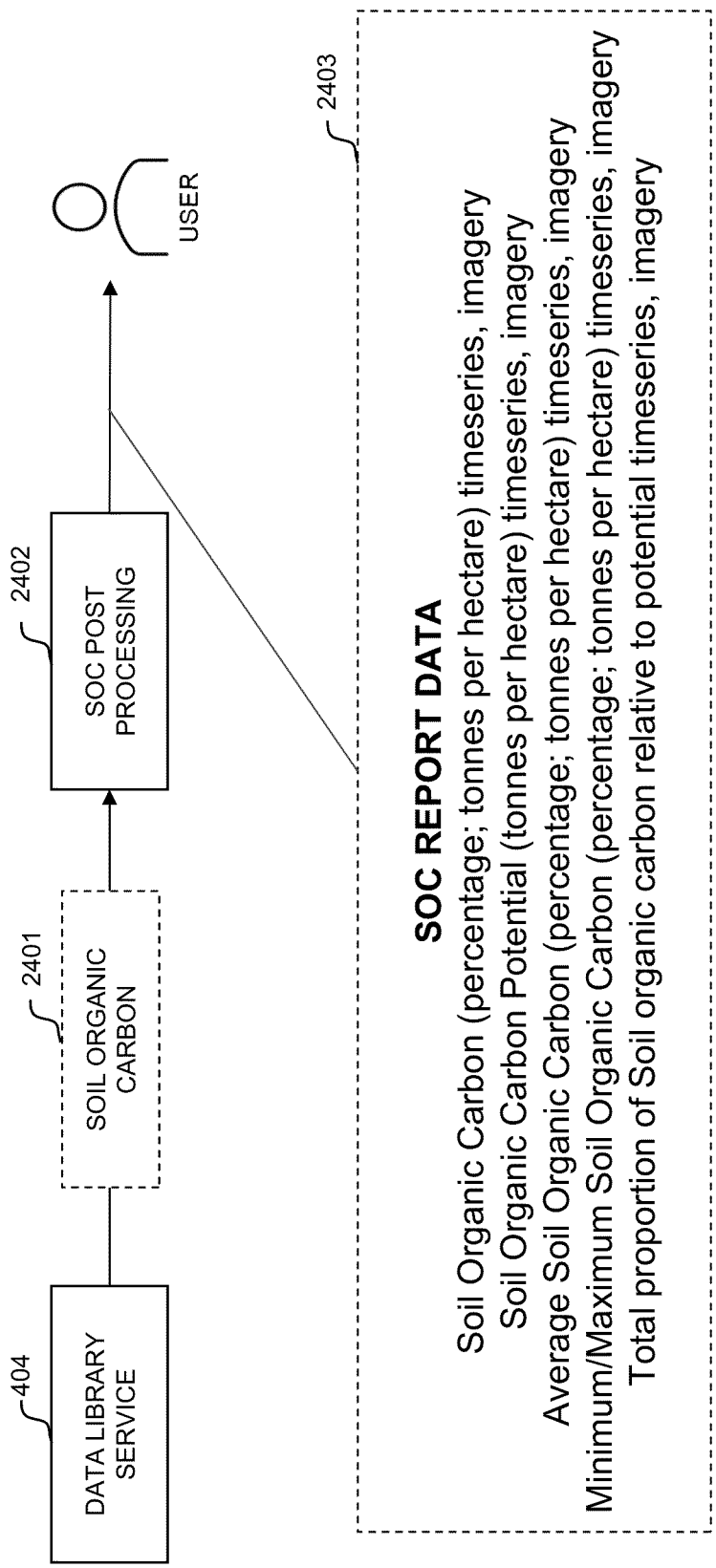
FIG. 24 shows a block diagram of a system for producing a soil organic carbon report, in accordance with an embodiment of the invention.

FIG. 24 shows an example of a system that generates a soil organic carbon report using the data library service 404, according some embodiments of the invention. In some embodiments, once the statistical relationships 1202 of the data library service 404 have been built in the training phase, information on soil organic carbon 2401 can be extracted during the querying phase of the data library service 404. According to some embodiments of the invention, a soil organic carbon (SOC) post processing module 2402 formats the soil organic carbon data 2401 into a soil organic carbon report 2403, which is suitable for user review. According to some embodiments of the invention, the soil organic carbon report 2403 may include one or more of soil organic carbon report 2500, realisable soil organic carbon report 2600, and soil organic carbon time series 2700.

Figure 25:
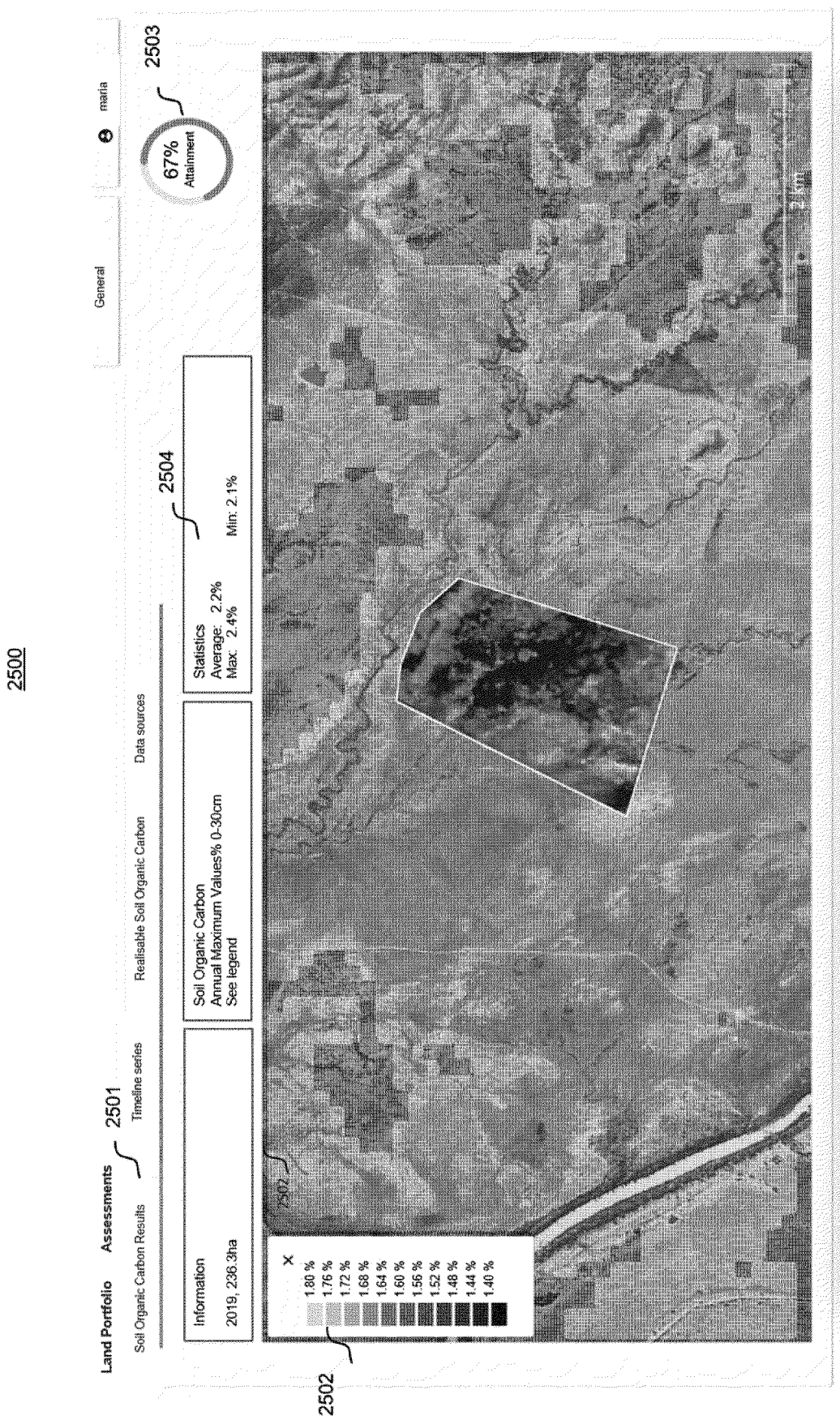
FIG. 25 shows an example of the soil organic carbon report for satellite data used as input by the automatic natural capital measurement system, in accordance with an embodiment of the invention.

FIG. 25 shows an example of a soil organic carbon report 2500 produced by querying the data library service 404. According to some embodiments of the invention, the soil organic carbon results 2501 are expressed as a soil organic carbon distribution of percentages 2502 overlaid on the analysed area 603. According to some embodiments of the invention, the total health 2503 of the analysed area 603 is the annual average soil organic carbon 2502, given in tonnes per hectare, with respect to a realisable potential 2600, and the minimum, maximum and average total soil organic carbon 2504.

Figure 26:
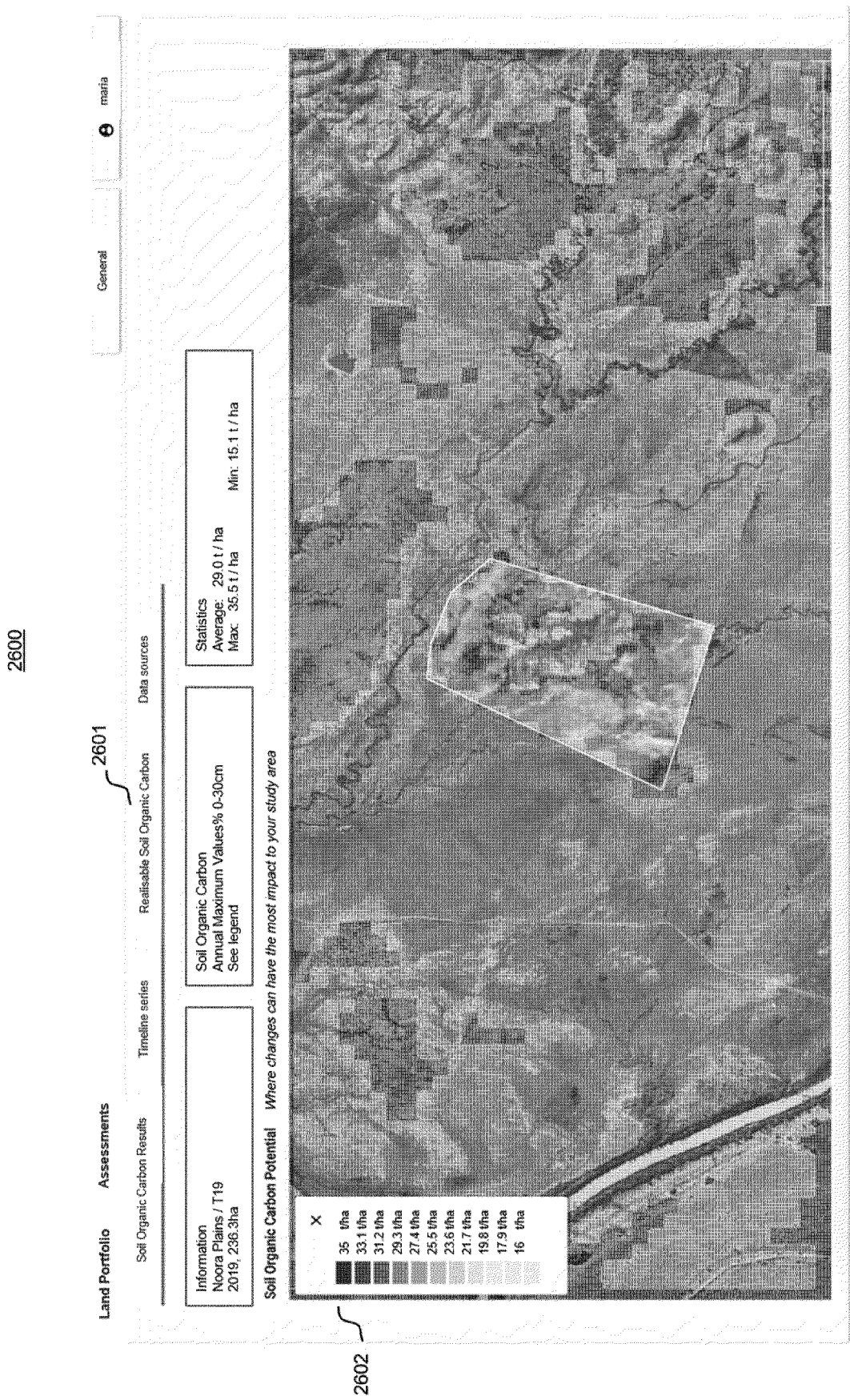
FIG. 26 shows an example of a soil organic carbon potential, termed realisable soil organic carbon, for satellite data used as input by the automatic natural capital measurement system, in accordance with an embodiment of the invention.

FIG. 26 shows an example of a realisable soil organic carbon report 2600 produced by the data library service 404. According to some embodiments of the invention, the realisable soil organic carbon 2601 may be expressed as a distribution of tons of carbon per hectare 2602 overlaid on the analysed area 603.

Figure 27:
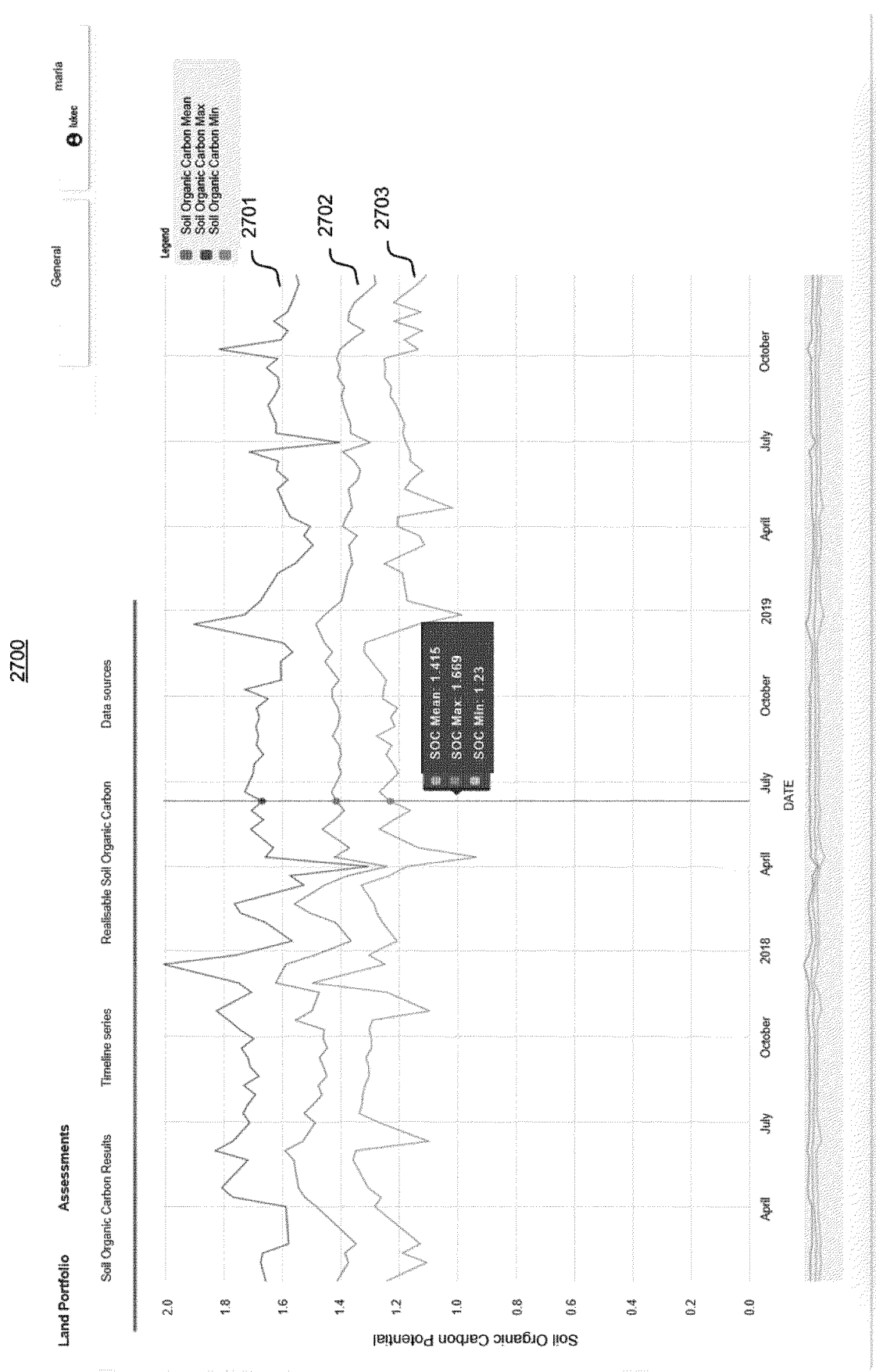
FIG. 27 shows an example of a soil organic carbon percentage time series for satellite data used as input by the automatic natural capital measurement system, in accordance with an embodiment of the invention.

FIG. 27 shows an example of soil organic carbon percentage results (included in the soil organic carbon report 2500) produced by the data library service 404 and expressed as timeline series 2700. According to some embodiments of the invention, the soil organic carbon percentage maximum 2701, the soil organic carbon percentage minimum 2703, and the soil organic carbon percentage mean 2702 for the analysed area 603 are plotted in time 2700. Soil organic carbon percentage minimum 2703 and soil organic carbon percentage maximum 2701 determine how the land of the analysed area 603 can be used, which is essential for climate change mitigation.

Figure 28:
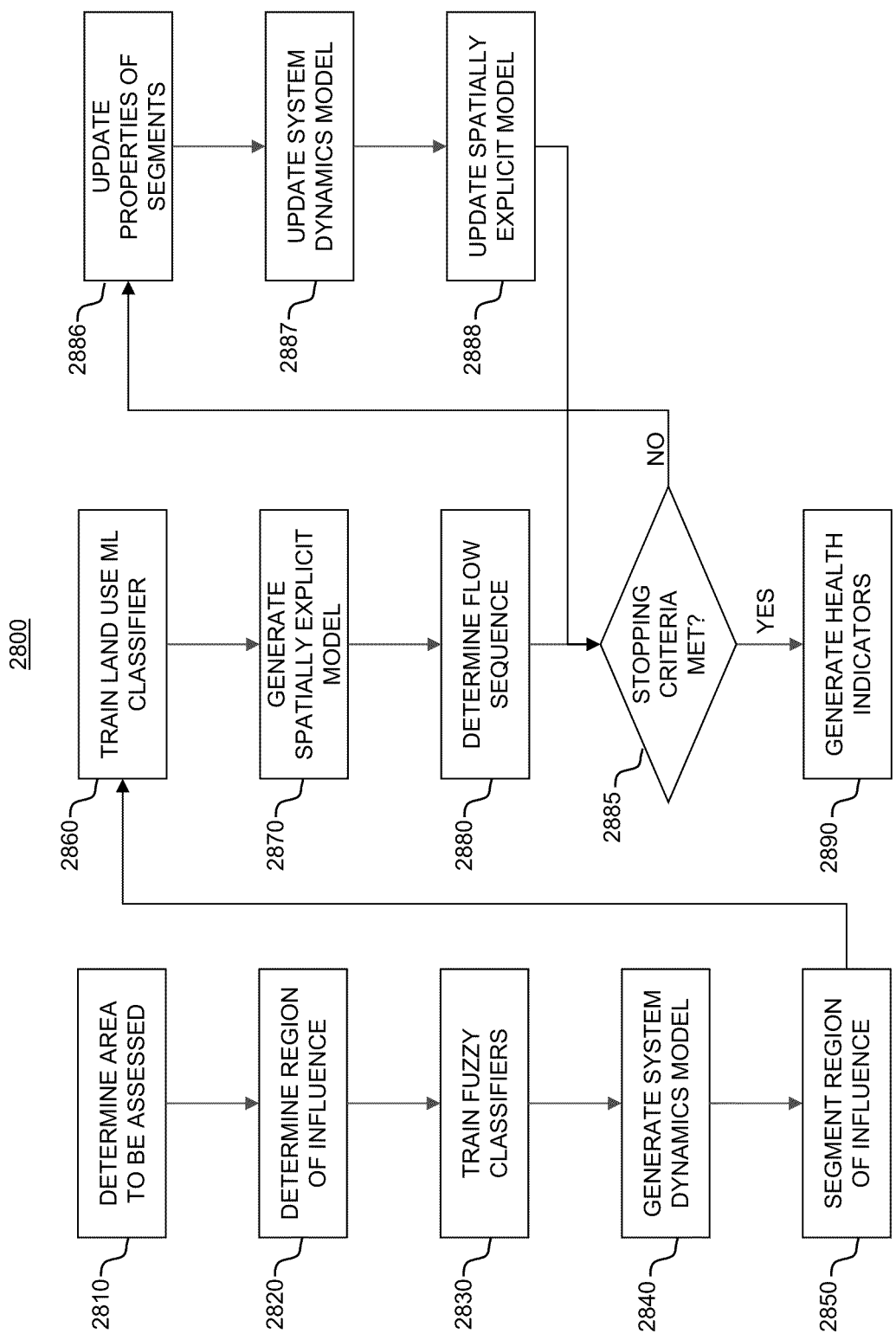
FIG. 28 shows a flow diagram of a method of measuring natural capital, in accordance with an embodiment of the invention.

FIG. 28 shows a flowchart of a processor executable method 2800 of measuring natural capital, according to some embodiments of the invention. In step 2810, an area 603 whose natural capital is to be assessed using one or more health indicators is determined from user input received from the user 401. In step 2820, the corresponding region of influence 702 for the area 603 is determined. In step 2830, one or more fuzzy classifiers are trained on historical statistical distributions between a plurality of state variables and one or more properties of the region of influence to generate statistical relationships 1202 between the plurality of state variables and the one or more properties of the region of influence 702. In step 2840, the system dynamics model 410 defining interactions between the one or more properties of the region of influence based on the generated statistical relationships 1202 obtained from the trained fuzzy classifiers is generated. In step 2850, the region of influence 702 is segmented into a plurality of segments (for example, the gridded pixels shown in the spatially explicit model 411 in FIG. 17).

In step 2860, one or more land use classifiers (such as the satellite imagery machine learning classifier 804 and the land classification decision tree 803) are trained to classify the area 603 into one or more land use categories 805. In step 2870, the spatially explicit model 411, which defines transport of material between the plurality of segments, is generated based on elevation data obtained from one or more databases and land use data indicating a land use category associated with each segment of the plurality of segments and obtained from the trained land use classifiers. In step 2880, a flow sequence for simulating transport of one or more materials from one or more segments of the plurality of segments to adjacent segments is determined. In some embodiments, the flow sequence is based at least on the generated system dynamics model 410 and the generated spatially explicit model 411, and is determined by assigning a stream order number to each respective segment of the plurality of segments based on a number of inflows to the respective segment from other segments of the plurality of segments and a number of outflows from the respective segment to other segments.

In steps 2885-2888, the simulation of the flow sequence is executed by recursively processing the plurality of segments, based on each respective segment's stream order number, to update the one or more properties of the respective segment (step 2886) based on transport of the one or more materials from inflows to the respective segment and to outflows from the respective segment for a predetermined number of iterations, each iteration representing a time unit. In step 2887, the generated system dynamics model is updated after each iteration. In step 2888, the generated spatially explicit model is updated after each iteration. The sequence of steps 2886, 2887, and 2888 is repeated until a stopping criterion is met (step 2882). The stopping criterion may include a predetermined number of iterations, or a convergence function.

In step 2890, one or more health indicators 2202 for the natural capital of the area 603 are generated using the recursively updated spatially explicit model 411 and stored in a non-transitory storage device.

In some embodiments, the method 2800 further includes determining current or historical spatial distributions or statistics of the one or more health indicators 2202 for the area 603, and generating the system dynamics model 410 based at least on the determined current or historical spatial distributions or statistics. In some embodiments, the method 2800 determines the current or historical spatial distributions or statistics by querying the generated statistical relationships 1203 between the plurality of state variables and one or more soil organic carbon properties using measured one or more properties for the region of influence 702, and generating information on the one or more soil organic carbon properties for the region of influence 702 based at least on the queried generated statistical relationships. In some embodiments, the method 2800 further includes simulating the effects of climate change or land management options on the one or more health indicators 2202 for the natural capital of the area 603.

In some embodiments, the method 2800 further includes receiving, via a user interface, a user-drawn polygon representing the area 603. In some embodiments, the method 2800 further includes receiving, via a user interface, a parcel or land identifier associated with the area, and generating, using the received parcel or land identifier and a property boundary database, a polygon representing the area.

In some embodiments, the method 2800 further includes classifying the area 603 into one or more land portions and one or more water portions 902, and excluding the classified one or more water portions 902 from the region of influence 702.

In some embodiments, the segments generated in step 2850 are defined by uniform geometric shapes or non-uniforms areas of homogenous properties. In some embodiments, the plurality of state variables includes one or more of rainfall, temperature, land cover, biome, soil type, leaf area index, dry matter productivity and normalised difference vegetation index, short wave infrared, fractional cover, or soil moisture. In some embodiments, the one or more properties of the region of influence 703 include soil organic carbon concentration, nitrogen concentration, phosphorus concentration, coarse fraction, and bulk density. In some embodiments, the one or more materials whose flow is simulated in step 2886 include at least one of water, nutrient, or sediment. In some embodiments, the one or more health indicators 2202 include at least one of water holding capacity, erosion potential, flood control, nutrient concentration, water quality, water quantity, biodiversity, total carbon, or sequestered carbon.

Subsets or combinations of various embodiments described above provide further embodiments. These and other changes can be made to the invention in light of the above-detailed description and still fall within the scope of the present invention. In general, in the following claims, the terms used should not be construed to limit the invention to the specific embodiments disclosed in the specification. Accordingly, the invention is not limited by the disclosure, but instead its scope is to be determined entirely by the following claims.

The invention claimed is:

1. A processor executable method of measuring natural capital comprising:

determining an area whose natural capital is to be assessed;

determining a region of influence for the area;

training a fuzzy classifier on historical statistical distributions between a plurality of state variables and one or more properties of the region of influence to generate statistical relationships between the plurality of state variables and the one or more properties of the region of influence;

generating a system dynamics model defining interactions between the one or more properties of the region of influence based on the generated statistical relationships obtained from the trained fuzzy classifier;

segmenting the region of influence into a plurality of segments;

training a land use classifier to classify the area into one or more land use categories;

generating a spatially explicit model, which defines transport of material between the plurality of segments, based on elevation data obtained from one or more databases and land use data indicating a land use category associated with each segment of the plurality of segments, wherein the land use category is obtained from the trained land use classifier;

determining a flow sequence, for simulating the transport of one or more materials from one or more segments of the plurality of segments to adjacent segments based at least on the generated system dynamics model and the generated spatially explicit model, by assigning a stream order number to each respective segment of the plurality of segments based on a number of inflows to the respective segment from other segments of the plurality of segments and a number of outflows from the respective segment to other segments;

executing the simulation of the flow sequence by:
recursively processing the plurality of segments, based on each respective segment's stream order number, to update the one or more properties of the respective segment based on transport of the one or more materials from inflows to the respective segment and to outflows from the respective segment for a predetermined number of iterations, each iteration representing a time unit; and updating the generated system dynamics model and the generated spatially explicit model after each iteration;

generating one or more health indicators for the natural capital of the area using the recursively updated spatially explicit model; and storing the generated one or more health indicators in a non-transitory storage device.

2. The method according to claim 1, further including:
determining current or historical spatial distributions or statistics of the one or more health indicators for the area; and generating the system dynamics model based at least on the determined current or historical spatial distributions or statistics.

3. The method according to claim 2, further including determining the current or historical spatial distributions or statistics by:
querying the generated statistical relationships between the plurality of state variables and one or more soil organic carbon properties from the one or more properties for the region of influence; and generating soil compound information on the one or more soil organic carbon properties for the region of influence based at least on the queried generated statistical relationships.

4. The method according to claim 1, further including simulating the effects of climate change or land management options on the one or more health indicators for the natural capital of the area.

5. The method according to claim 1, further including receiving, via a user interface, a user-drawn polygon representing the area.

6. The method according to claim 1, further including: receiving, via a user interface, a parcel or land identifier associated with the area; and generating, using the received parcel or land identifier and a property boundary database, a polygon representing the area.

7. The method according to claim 1, further including: classifying the area into one or more land portions and one or more water portions; and excluding the classified one or more water portions from the region of influence.

8. The method according to claim 1, wherein segments of the plurality of segments are defined by uniform geometric shapes or non-uniforms areas of homogenous properties.

9. The method according to claim 1, wherein the plurality of state variables includes one or more of rainfall, temperature, land cover, biome, soil type, leaf area index, dry matter productivity and normalised difference vegetation index, short wave infrared, fractional cover, or soil moisture.

10. The method according to claim 1, wherein the one or more properties of the region of influence include soil organic carbon concentration, nitrogen concentration, phosphorus concentration, coarse fraction, and bulk density.

11. The method according to claim 1, wherein the one or more materials include at least one of water, nutrient, or sediment.

12. The method according to claim 1, wherein the one or more health indicators include at least one of water holding capacity, erosion potential, flood control, nutrient concentration, water quality, water quantity, biodiversity, total carbon, or sequestered carbon.

13. A natural capital measurement system comprising:
a memory configured to store instructions; and
a processor communicatively connected to the memory and configured to execute the stored instructions to:
determine an area whose natural capital is to be assessed;
determine a region of influence for the area;
train a fuzzy classifier on historical statistical distributions between a plurality of state variables and one or more properties of the region of influence to generate statistical relationships between the plurality of state variables and the one or more properties of the region of influence;
generate a system dynamics model defining interactions between the one or more properties of the region of influence based on the generated statistical relationships obtained from the trained fuzzy classifier;
segment the region of influence into a plurality of segments;
train a land use classifier to classify the area into one or more land use categories;
generate a spatially explicit model, which defines transport of material between the plurality of segments, based on elevation data obtained from one or more databases and land use data indicating a land use category associated with each segment of the plurality of segments, wherein the land use category is obtained from the trained land use classifier;
determine a flow sequence, for simulating the transport of one or more materials from one or more segments of the plurality of segments to adjacent segments based at least on the generated system dynamics model and the generated spatially explicit model, by assigning a stream order number to each respective segment of the plurality of segments based on a number of inflows to the respective segment from other segments of the plurality of segments and a number of outflows from the respective segment to other segments;
execute the simulation of the flow sequence by:
recursively processing the plurality of segments, based on each respective segment's stream order number, to update the one or more properties of the respective segment based on transport of the one or more materials from inflows to the respective segment and to outflows from the respective segment for a predetermined number of iterations, each iteration representing a time unit; and
updating the generated system dynamics model and the generated spatially explicit model after each iteration;
generate one or more health indicators for the natural capital of the area using the recursively updated spatially explicit model; and
store the generated one or more health indicators in a non-transitory storage device.

14. A non-transitory computer-readable storage medium configured to store a program that performs a method of measuring natural capital, the method comprising:
determining an area whose natural capital is to be assessed;
determining a region of influence for the area;
training a fuzzy classifier on historical statistical distributions between a plurality of state variables and one or more properties of the region of influence to generate statistical relationships between the plurality of state variables and the one or more properties of the region of influence;

generating a system dynamics model defining interactions between the one or more properties of the region of influence based on the generated statistical relationships obtained from the trained fuzzy classifier;

segmenting the region of influence into a plurality of segments;

training a land use classifier to classify the area into one or more land use categories;

generating a spatially explicit model, which defines transport of material between the plurality of segments, based on elevation data obtained from one or more databases and land use data indicating a land use category associated with each segment of the plurality of segments, wherein the land use category is obtained from the trained land use classifier;

determining a flow sequence, for simulating the transport of one or more materials from one or more segments of the plurality of segments to adjacent segments based at least on the generated system dynamics model and the generated spatially explicit model, by assigning a stream order number to each respective segment of the plurality of segments based on a number of inflows to the respective segment from other segments of the plurality of segments and a number of outflows from the respective segment to other segments;

executing the simulation of the flow sequence by:
  recursively processing the plurality of segments, based on each respective segment's stream order number, to update the one or more properties of the respective segment based on transport of the one or more materials from inflows to the respective segment and to outflows from the respective segment for a predetermined number of iterations, each iteration representing a time unit; and
  updating the generated system dynamics model and the generated spatially explicit model after each iteration;

generating one or more health indicators for the natural capital of the area using the recursively updated spatially explicit model; and storing the generated one or more health indicators in a non-transitory storage device.

* * * * *